(12) United States Patent
Menendez

(10) Patent No.: US 7,203,654 B2
(45) Date of Patent: Apr. 10, 2007

(54) METHOD OF EXPEDITING INSURANCE CLAIMS

(76) Inventor: Dale Menendez, 444 Hunters Way, Fox River Grove, IL (US) 60021

( * ) Notice: Subject to any disclaimer, the term of this patent is extended or adjusted under 35 U.S.C. 154(b) by 191 days.

(21) Appl. No.: 10/740,066

(22) Filed: Dec. 18, 2003

(65) Prior Publication Data

US 2004/0148204 A1    Jul. 29, 2004

Related U.S. Application Data

(60) Provisional application No. 60/438,019, filed on Jan. 4, 2003.

(51) Int. Cl.
*G06Q 40/00* (2006.01)
(52) U.S. Cl. .................... 705/4; 705/2; 705/3
(58) Field of Classification Search ........... 705/2, 705/3, 4
See application file for complete search history.

(56) References Cited

U.S. PATENT DOCUMENTS

| | | | | |
|---|---|---|---|---|
| 5,182,705 | A | * | 1/1993 | Barr et al. ............ 705/11 |
| 5,235,507 | A | * | 8/1993 | Sackler et al. ......... 705/2 |
| 5,325,291 | A | * | 6/1994 | Garrett et al. ......... 705/4 |
| 5,960,338 | A | * | 9/1999 | Foti .................. 455/405 |
| 6,029,141 | A | * | 2/2000 | Bezos et al. .......... 705/27 |
| 6,049,773 | A | * | 4/2000 | McCormack et al. ..... 705/4 |
| 2002/0007289 | A1 | * | 1/2002 | Malin et al. .......... 705/4 |
| 2002/0035528 | A1 | | 3/2002 | Simpson et al. ........ 705/35 |
| 2004/0019507 | A1 | * | 1/2004 | Yaruss et al. ......... 705/4 |
| 2004/0034657 | A1 | * | 2/2004 | Zambo et al. ........ 707/104.1 |

FOREIGN PATENT DOCUMENTS

EP    722145 A1  *  7/1996

OTHER PUBLICATIONS

"AISG Boosts Database Fraud-Fighting Capability (American Insurance Services Group expand its Index System, rolls out Search Only System Software for Special Investigation Units", Susan Sclafane, National Underwriter Property&Casualty, n 37, p6+, Sep. 11, 2005.*

* cited by examiner

*Primary Examiner*—Robert Morgan
(74) *Attorney, Agent, or Firm*—Welsh & Katz, Ltd.

(57) ABSTRACT

A method and apparatus are provided for processing an insurance claim. The method includes the steps of receiving a claim for a loss from an insured through an Internet connection and determining a policy type from the claim. The method further includes the steps of retrieving a set of keywords based upon the policy type, matching the retrieved set of keywords with words contained within the received claim, assigning an adjuster to the claim when any matched words of the matching step meets a predetermined criteria and paying the claim without assigning the claim to an adjuster when the matching does not meet the predetermined criteria and any auxiliary criteria.

1 Claim, 22 Drawing Sheets

SYSTEM FOR PROCESSING CLAIMS

SYSTEM FOR PROCESSING CLAIMS

FIG. 3

SPECIFIC TO CLIENT

INTRO ( NEXT )

FIG. 4

NATIONAL RETAIL/DEPARTMENT STORE
SELF INSURED RETENTION

IF THIS CLAIM INVOLVES SERIOUS DAMAGE OR DESTRUCTION AND RESOURCES ARE NEEDED IMMEDIATELY PLEASE COMPLETE THE REPORT OF CLAIM AND YOU WILL THEN BE DIRECTED TO AN EMERGENCY CLAIM REPORTING SCREEN.

THIS SYSTEM WILL ACCEPT A REPORT OF CLAIM FOR DAMAGES TO YOUR STORE AND PROCESS THE INFORMATION FOR A CREDIT FROM THE RISK MANAGEMENT RESERVE TO THE STORE'S ACCOUNTS ON WHICH THE LOSS WAS INCURRED. YOU, AS THE STORE MANAGER, MAY CLAIM MERCHANDISE, CLEAN-UP AND REPAIR SERVICES, BUILDING REPAIRS, EQUIPMENT, SUPPLIES INCLUDING EMPLOYEES LABOR DIRECTLY ASSOCIATED WITH INVENTORY, MOVING, CLEANING AND DAMAGES.

ALL DAMAGES MUST BE CLAIMED AS INCURRED AND AS DOCUMENTED. MERCHANDISE IS CREDITED AT COST. LIST MERCHANDISE BY DIVISION WITH A DESCRIPTION, SELL PRICE AND THE MARK UP BY DIVISION FROM YOUR STORE INVENTORY VALUE RECORDS. SERVICE VENDERS COSTS MUST BE PAID DIRECT BY THE STORE TO THE VENDER. THE ACCOUNT NUMBER IT IS PAID FROM MUST BE STATED NEXT TO THE SERVICE INCURRED AND COST CLAIMED. EMPLOYEE LABOR MUST BE LISTED BY EMPLOYEE, DATE AND HOURS WORKED WITH THE PROPER LABOR RATE AND CODE.

EQUIPMENT ORDERED AND REPLACED OR REPAIRED MUST SHOW THE ACCOUNT NUMBER INCURRING THE COST. BUILDING DAMAGES REPAIRED AND INCURRED ON A SEPARATE JOB AUTHORIZATION MUST BE LISTED BY THE JOB NUMBER. ONLY DAMAGES THAT ARE A DIRECT RESULT OF THE LOSS MAY BE CLAIMED.

<u>WARNING</u>: REPORTING A FICTITIOUS CLAIM, EXAGGERATING DAMAGES OR INTENTIONALLY CLAIMING MORE DAMAGES THAN ACTUALLY INCURRED MAY RESULT IN SERIOUS CONSEQUENCES THAT MAY INCLUDE DISCIPLINARY ACTIONS.

2 — ☐ I AGREE TO THE TERMS AS STATED ABOVE. CHECKING THIS BOX SHALL OBLIGATE YOU TO THE SAME EXTENT AS YOUR SIGNATURE.

3 — TYPE YOUR FULL NAME HERE AS YOUR SIGNATURE: [____4____]   TITLE: [____]   STORE #: [__5__]   (NEXT)

DATE OF LOSS [__6__]

FIG. 5

CLAIM INSTRUCTIONS

IMPORTANT: IF THERE IS AN IMMEDIATE NEED FOR CONTACTS OR RESOURCES TO CONTROL THE LOSS AND DAMAGE CLICK ON THE <u>EMERGENCY</u> ICON BELOW. YOU WILL FIRST BE REQUIRED TO COMPLETE AN INITIAL REPORT.

THE CLAIM MUST BE REPORTED IMMEDIATELY AND MUST BE COMPLETED AND FINALIZED WITHIN 30 DAYS. FAILURE TO DO SO MAY RESULT IN AN ADJUSTER BEING ASSIGNED TO ASSIST AND EVALUATE THE CAUSE OF LOSS, COVERAGE AND DAMAGES CLAIMED

YOU ARE ASKED TO COMPLETE THE CLAIM INFORMATION PAGES SUCCESSFULLY AND PROVIDE INFORMATION, PRICING AND DETAILS ON THE DAMAGED PROPERTY. IF YOU ARE UNABLE TO ENTER INFORMATION NECESSARY YOU MAY NOT BE ABLE TO FINALIZE THE CLAIM OR THE CLAIM WILL BE PENDING UNTIL THE INFORMATION IS AVAILABLE.

ONCE FINALIZED AND SUBMITTED, THE CLAIM ADJUSTMENT MAY BE COMPLETED AND YOU WILL RECEIVE AN EMAIL CONFIRMING THE AMOUNT OF CREDIT. HOWEVER, YOU MAY BE NOTIFIED THAT AN ADJUSTER HAS BEEN ASSIGNED TO REVIEW AND FINALIZE THE CLAIM. IF SO, YOU ARE ASKED TO PLEASE COOPERATE WITH THE ADJUSTER AND ANSWER AND QUESTIONS AND/ OR PROVIDE ANY DOCUMENTATION REQUESTED THAT IS ASSOCIATED WITH THE CLAIM.

<u>EMERGENCY</u>   <u>CONTINUE</u>

FIG. 6

CLAIM REPORT

UNIT NUMBER [9]

TYPE OF STORE: [10]   PREMISES OWNED [11]   LEASED [12]

LOCATION STREET: [13]

CITY, STATE AND ZIP: [14]

EMAIL: [15]   PHONE #: [16]   CELL PHONE: [17]

DATE OF LOSS: [18]   TIME: [19]   CHOOSE TYPE OF LOSS FROM LIST [20]

LOCATION OF LOSS: [21]

DID THIS LOSS OCCUR ON OR OFF THE PREMISES INSURED?   ON [22]   OFF [23]

WHAT HAS BEEN DAMAGED? CLICK ON ALL THAT APPLY.   BUILDING [24]   MERCHANDISE [25]   MONEY/SECURITIES [26]   JEWELRY [27]

ADDITIONAL EXPENSES   EQUIP & SUPPLIES [28]   OTHER - DESCRIBE HERE [29]

[30]

HOW MUCH WOULD YOU ESTIMATE ARE YOUR TOTAL DOLLAR DAMAGES? [31]

EMERGENCY - WHAT NUMBER CAN YOU BE REACHED AT NOW? [32]

IS THERE SALVAGE VALUE TO DAMAGED MERCHANDISE?   YES [33]   NO [34]

FIG. 7

IS A THIRD PARTY POSSIBLY RESPONSIBLE FOR THE  YES ☐—35  NO ☐—36
DAMAGES?

PLEASE ENTER A BRIEF, BUT COMPLETE DETAILED DESCRIPTION OF HOW THE LOSS OCCURRED. THE FACTS ARE VERY
IMPORTANT AND WE ASK THAT YOU INCLUDE THE WHO, WHAT, HOW AND WHY.

[ ◆ ]—37

( NEXT )—38

FIG. 8

EMERGENCY RESOURCES

IF THERE IS AN IMMEDIATE AND SERIOUS NEED FOR THE CONTACT WITH A CLAIM ADJUSTER / VENDER TO ASSIST AND BECOME INVOLVED DUE TO THE SIZE OR COMPLEXITY OF THE LOSS PLEASE USE THE NOTIFICATION ICON BELOW.

PLACE AN X NEXT TO ALL RESOURCES NEEDED, THEN HIT SUBMIT. AN ELECTRONIC MESSAGE WILL BE SENT AND YOU WILL BE CONTACTED BY PHONE IMMEDIATELY AT THE EMERGENCY NUMBER YOU PROVIDED.

39 — ☐ ADJUSTER (SERIOUS OR POTENTIAL LOSS OVER $ SET PARAMETER)

40 — ☐ EMERGENCY SERVICES FOR WATER, FIRE, SMOKE, ETC.

41 — ☐ SALVAGE TEAM TO REMOVE DAMAGED PROPERTY / MERCHANDISE.

42 — ☐ INVESTIGATION / EXPERT (IF OTHERS MAY BE RESPONSIBLE FOR DAMAGING PROPERTY)

43 — ☐ BUILDING REPAIR CONTRACTOR OR CONSTRUCTION TEAM

44 — ▭

TO CONTINUE: ( NEXT ) — 45

FIG. 9

BUILDING DAMAGE

WHAT HAS BEEN DAMAGED?   46 ☐ INTERIOR   47 ☐ STRUCTURAL   UNIT NO: ▭ 54   48 ☐ HVAC   49 ☐ FIRE SPRINKLER

CLICK ON ALL THAT APPLY   50 ☐ EXTERIOR   51 ☐ ELECTRICAL   52 ☐ ROOF   53 ☐ OTHER

ENTER JOB NUMBER:   ▭ 55   ROUGH ESTIMATE TOTAL BUILDING DAMAGES   ▭ 56

DO YOU HAVE AN ESTIMATE FROM A CONTRACTOR?   YES ☐ 57   NO ☐ 58   PENDING ☐ 59

NAME OF THE CONTRACTOR:   ▭ 60   CONTACTS NAME   ▭ 61

STREET ADDRESS   ▭ 62

CITY, STATE & ZIP   ▭ 63

OFFICE PHONE NO:   ▭ 64   EMAIL.   ▭ 65

CELL PHONE NO:   ▭ 66   IS THE BUILDING LEASED OR OWNED?   [CHOOSE ONE ▼] 67

FIG. 10

LIST THE MAJOR BUILDING ITEMS DAMAGED AND VALUE CLAIMED:

| ITEM / DESCRIPTION: | COST TO REPAIR / REPLACE |
|---|---|
| 1. ⎯68 | ⎯69 |
| 2. ⎯70 | ⎯71 |
| 3. ⎯72 | ⎯73 |
| 4. ⎯74 | ⎯75 |
| 5. ⎯76 | ⎯77 |
| 6. ⎯78 | ⎯79 |
| 7. ⎯80 | ⎯81 |
| 8. ⎯82 | ⎯83 |
| 9. ⎯84 | ⎯85 |
| 10. ⎯86 | ⎯87 |

TOTAL $ BUILDING DAMAGES CLAIMED: ⎯88

TO COLLECT REPLACEMENT COST YOU MUST AGREE TO REPAIR AND/OR REPLACE THE PROPERTY TO THE CONDITION EXISTING PRIOR TO THE LOSS USING THE CLAIM PROCEEDS. REMODELING OR UPGRADES MAY NOT BE CLAIMED. YOU MUST AGREE TO THESE REQUIREMENTS.   YES, I AGREE ☐⎯90

PROJECT CONSULTANT'S NAME ⎯89     OFFICE PHONE ⎯91

EMAIL ⎯92

NEXT ⎯93

FIG. 11

MERCHANDISE DAMAGE

UNIT NO: ▭ —97

WHAT HAS BEEN LOST / DAMAGED? HARD ☐—94  SOFT ☐—95  SPECIALTY ☐—96  OTHER ☐—98
CLICK ALL THAT APPLY           LINES         LINES        LINES

IS THERE ANY SALVAGE VALUE TO DAMAGED MERCHANDISE?   YES ☐—99   NO ☐—100

IF YES, HAS THE NATIONAL SALVER BEEN ENGAGED AS
REQUIRED?                                            YES ☐—101  NO ☐—102

IS SOME OF THE DAMAGED MERCHANDISE BEING SOLD
WITH A MARKDOWN?                                     YES ☐—103  NO ☐—104

| ITEM | DIV. | DESCRIPTION | QUANTITY | SELL PRICE | MARK DOWN | COST | $ AMOUNT CLAIMED |
|---|---|---|---|---|---|---|---|
| 1. | _105_ | _106_ | _107_ | _108_ | _109_ | _110_ | _111_ |
| 2. | _112_ | _113_ | _114_ | _115_ | _116_ | _117_ | _118_ |
| 3. | _119_ | _120_ | _121_ | _122_ | _123_ | _124_ | _125_ |
| 4. | _126_ | _127_ | _128_ | _129_ | _130_ | _131_ | _132_ |
| 5. | _133_ | _134_ | _135_ | _136_ | _137_ | _138_ | _139_ |
| 6. | _140_ | _141_ | _142_ | _143_ | _144_ | _145_ | _146_ |
| 7. | _147_ | _148_ | _149_ | _150_ | _151_ | _152_ | _153_ |
| 8. | _154_ | _155_ | _156_ | _157_ | _158_ | _159_ | _160_ |

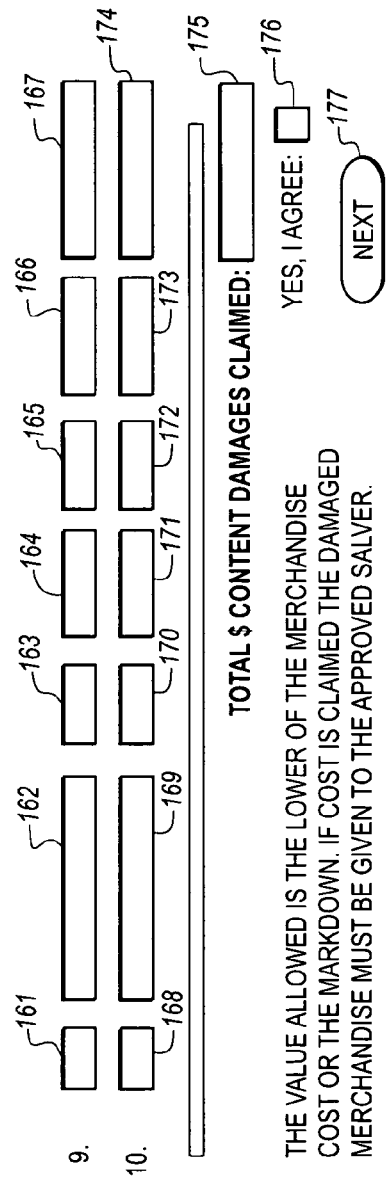

FIG. 13

PAYROLL, PROPERTY DAMAGE AND EXTRA EXPENSE                      UNIT NO. ☐

PAYROLL - TIMECARD EMPLOYEES ONLY

| ITEM | NAME | CO. CODE | RATE | HOURS | TOTAL |
|------|------|----------|------|-------|-------|
| 1.   | 179  | 180      | 181  | 182   | 183   |
| 2.   | 184  | 185      | 186  | 187   | 188   |
| 3.   | 189  | 190      | 191  | 192   | 193   |
| 4.   | 194  | 195      | 196  | 197   | 198   |
| 5.   | 199  | 200      | 201  | 202   | 203   |
| 6.   | 204  | 205      | 206  | 207   | 208   |
| 7.   | 209  | 210      | 211  | 212   | 213   |
| 8.   | 214  | 215      | 216  | 217   | 218   |
| 9.   | 219  | 220      | 221  | 222   | 223   |
| 10.  | 224  | 225      | 226  | 227   | 228   |

SUB-TOTAL PAYROLL  229

PROPERTY DAMAGE:

| ITEM | DESCRIPTION OF REPAIR / REPLACEMENT | VENDOR / COMPANY | ACCT. NO. | INVOICE | COST |
|------|--------------------------------------|------------------|-----------|---------|------|
| 1.   | 230                                  | 231              | 232       | 233     | 234  |
| 2.   | 235                                  | 236              | 237       | 238     | 239  |
| 3.   | 240                                  | 241              | 242       | 243     | 244  |

FIG. 14

| EXTRA EXPENSE ITEM | DESCRIPTION OF SERVICE / EXPENSE | | | | |
|---|---|---|---|---|---|
| 4. | _245_ | _246_ | _247_ | _248_ | _249_ |
| 5. | _250_ | _251_ | _252_ | _253_ | _254_ |
| | | | SUB-TOTAL EXTRA DAMAGE | | _255_ |
| | VENDOR / COMPANY | ACCT. NO. | INVOICE | COST | |
| 1. | _256_ | _257_ | _258_ | _259_ | _260_ |
| 2. | _261_ | _262_ | _263_ | _264_ | _265_ |
| 3. | _266_ | _267_ | _268_ | _269_ | _270_ |
| 4. | _271_ | _272_ | _273_ | _274_ | _275_ |
| 5. | _276_ | _277_ | _278_ | _279_ | _280_ |
| | | | SUB-TOTAL EXTRA EXPENSE | | _281_ |

SUMMARY OF EXPENSES INCURRED

PAYROLL EXPENSE _282_

PROPERTY DAMAGE EXPENSE _283_

EXTRA EXPENSES _284_

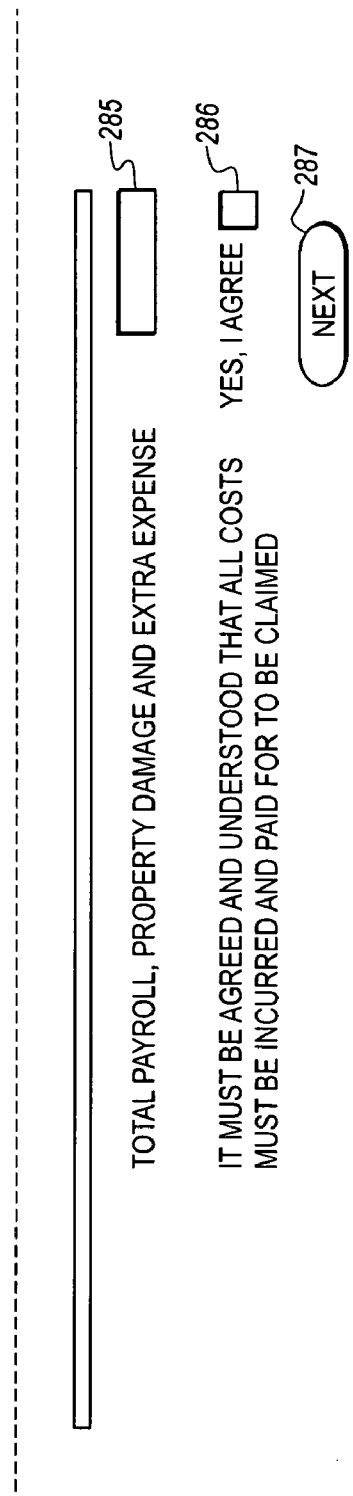

FIG. 16

SWORN STATEMENT IN PROOF OF LOSS

STORE / UNIT NUMBER: ▭—288

AT THE TIME OF THE LOSS NAME OF COMPANY INSURED THE FACILITY AND THE BUSINESS PROPERTY CONTAINED THEREIN FOR RISK OF DIRECT PHYSICAL LOSS.
—289

1. TIME AND ORIGIN: ▭  LOSS OCCURRED ON ▭—290
A
THE CAUSE AND ORIGIN OF THE LOSS IS ▭—291

2. OCCUPANCY: THE BUILDING DESCRIBED, OR CONTAINING THE PROPERTY DESCRIBED, WAS OCCUPIED AT THE TIME OF THE LOSS AS AN OWNED RETAIL OPERATION/FACILITY OF THE INSURED.

3. TITLE AND INTEREST: AT THE TIME OF THE LOSS THE INTEREST OF THE COMPANY IN THE PROPERTY DESCRIBED HEREIN WAS OWNER. NO OTHER PERSON OR ENTITY HAD AN INTEREST OR ENCUMBRANCE.

4. THE WHOLE LOSS AND DAMAGE IS AS FOLLOWS:

A. BUILDING DAMAGE ▭—292

B. MERCHANDISE DAMAGE ▭—293

C. PAYROLL, PROPERTY DAMAGE AND EXTRA EXPENSE ▭—294

FIG. 17

D. TOTAL ALL DAMAGE ☐ ~295

E. LESS DEDUCTIBLE ☐ ~296

F. NET CLAIM ☐ ~297

TO COLLECT YOU MUST AGREE TO THIS SWORN STATEMENT, AND BY YOUR AGREEMENT CONFIRM THE STATEMENTS ARE TRUE AND CORRECT TO THE BEST OF YOUR KNOWLEDGE AND BELIEF. I ACCEPT AND AGREE THAT MAKING ANY FALSE STATEMENTS AND/OR CLAIMS MAY RESULT IN SERIOUS CONSEQUENCES INCLUDING THE CLAIM DENIED. A CHECK MARK TO SIGNIFY AGREEMENT IS AGREED TO HAVE THE SAME LEGAL STANDING AS MY SIGNATURE.

I AGREE: ☐ ~298

SUBMIT ~299

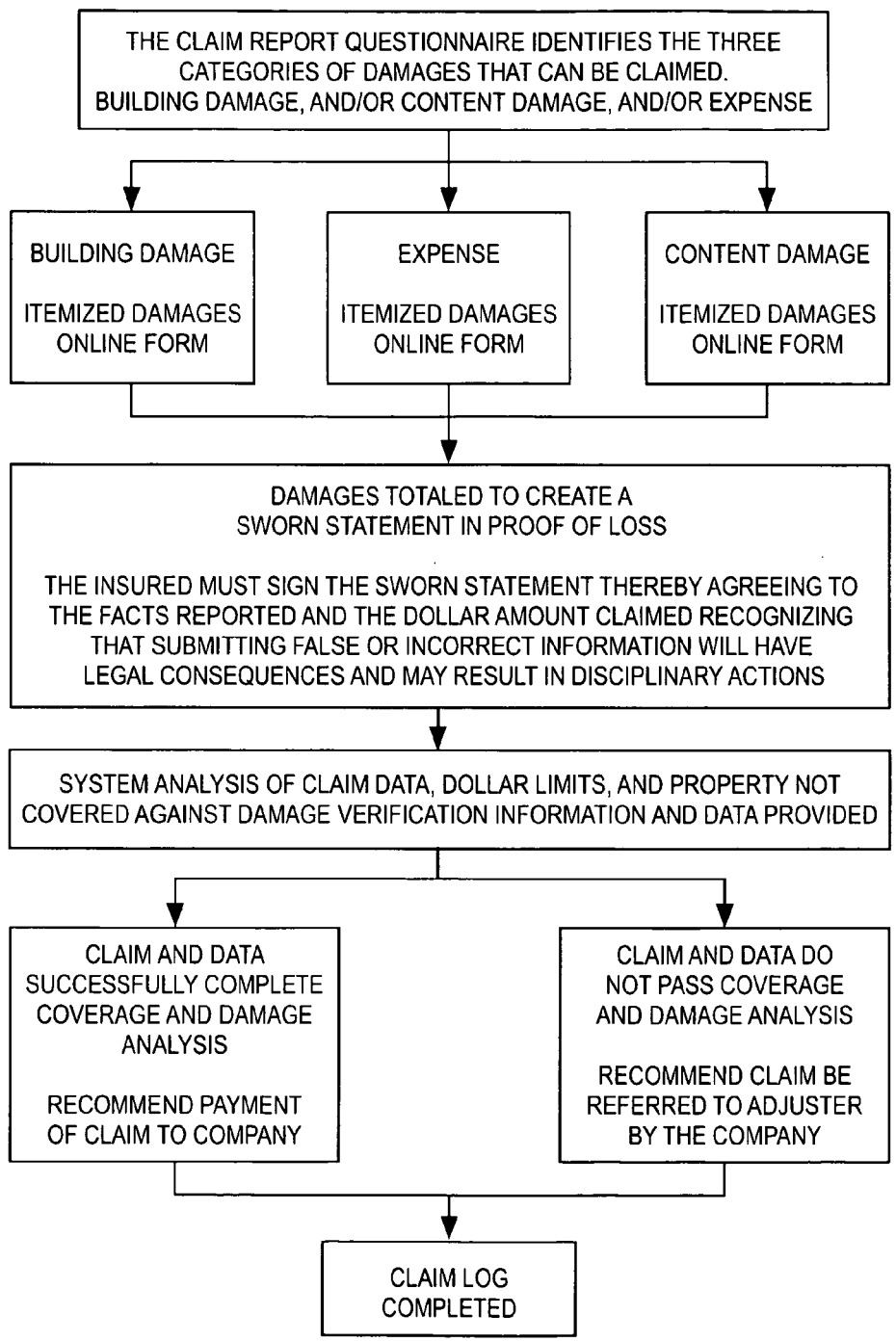

PAY / REFERRAL PROCESS FLOW CHART

FIG. 19

CLAIM RECORD AND LOG

THE CLAIM REPORT LOG IS A VIRTUAL CLAIM RECORD AND LOG BETWEEN THE COMPANY AND FASTTRACKCLAIMTM. A RECORD IS CREATED WHEN A CLAIM REPORT IS SUCCESSFULLY COMPLETED AND A CLAIM NUMBER IS ASSIGNED. AT THAT POINT THE CLAIM IS REFERRED TO AN ADJUSTER (RTA) IF IT DOES NOT PASS THE COVERAGE ANALYSIS OR IT CONTINUES TO THE DAMAGE VERIFICATION PROCESS. IF IT DOES NOT SUCCESSFULLY PASS THAT PROCESS AT ANY POINT IN THE DAMAGE SUBMISSION PROCESS THE CLAIM IS REFERRED TO ADJUSTER (RTA). IF THE CLAIM SUCCESSFULLY PASSES COVERAGE ANALYSIS AND DAMAGE VERIFICATION IT IS ON THE LOG AS A RECOMMENDED PAYMENT TO THE COMPANY. THE COMPANY MAY THEN CHOOSE TO RTA OR PAY THE CLAIM CLEARING THE CLAIM WHICH WILL THEN BE CLOSED ON THE FASTTRACKCLAIMTM RECORD AND SYSTEM.

AUTOMATIC ELECTRONIC CLAIM PAYMENTS

THE COMPANY / CLIENT IS ASKED TO ASSIGN A CLAIM ADMINISTRATOR TO REVIEW AND PROCESS THE ONLINE CLAIM RECORD FOR PAYMENT OR REFERRAL TO ADJUSTER. IF FTC RECOMMENDS PAYMENT IT IS THE COMPANY'S OPTION TO PAY THE CLAIM. ONCE THE PROGRAM IS IN PROCESS AND LIVE CLAIMS ARE BEING PROCESSED THE PROCEDURE CAN BE MANIPULATED AND THE SYSTEM CONSTRAINTS ADJUSTED FOR OPTIMAL RESULTS. ONCE CLAIM PAYMENTS BECOME ROUTINE AND IT IS CLEAR THE SYSTEM IS FUNCTIONING PROPERLY THE PROCESS MAY BE AUTOMATED TO ELECTRONICALLY PAY CLAIMS WITHOUT DIRECTION FROM THE CLAIM ADMINISTRATOR. USING EDI OR OTHER ELECTRONIC DATA INTERFACE SYSTEMS THE COMPANY SYSTEM AND FTC SYSTEM CAN EXCHANGE DATA AND INFORMATION AS NECESSARY TO ELECTRONICALLY AUTOMATE THE PAYMENT PROCESS PAYING CLAIMS BASED UPON SYSTEM INFORMATION.

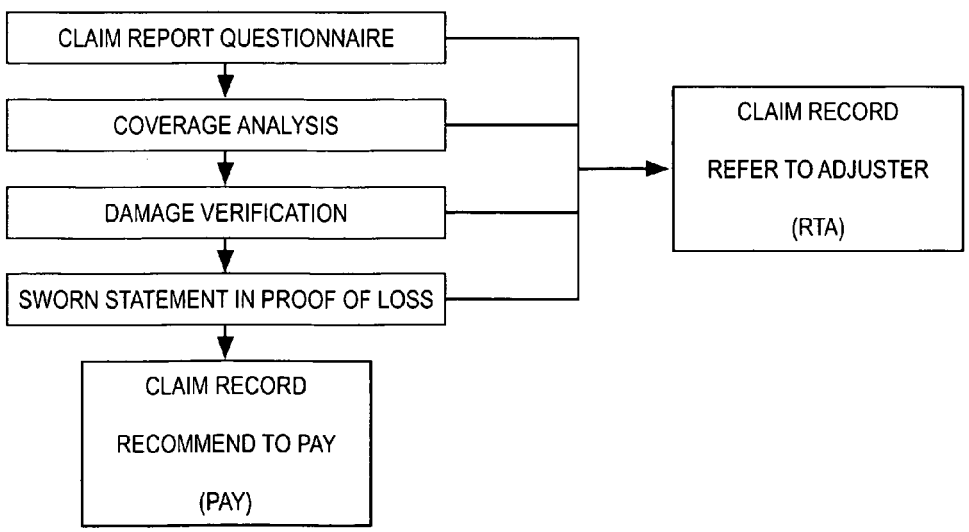

CLAIM REPORTING FLOW CHART

COVERAGE ANALYSIS FLOW CHART

METHOD OF EXPEDITING INSURANCE CLAIMS this application is a continuation of provisional application No. 60/438,019 filed Jan. 4, 2003.

FIELD OF THE INVENTION

The field of the invention relates to the insurance industry and more particularly to the payment of claims on insurable losses.

BACKGROUND OF THE INVENTION

The insurance industry exists for the purpose of protecting clients from unexpected losses. Typically, an insurance actuary calculates (or estimates) the probability and frequency of a loss, adds a safety margin and then charges a premium based upon the calculated probabilities.

On the average, insurance companies are profitable based upon their ability to accurately calculate the probability and frequency of losses and upon their ability to efficiently process claims. To efficiently process claims, an insurance company must be able to detect and recognize fraudulent claims without interfering with the processing of valid claims.

It has been generally recognized that fraudulent claims form a very small portion of the total claims filed in any given time period. In addition, when a small amount of money is involved, insurance companies frequently find that it is more cost effective to pay claims rather than to investigate such claims.

In general, the greatest number of property claims consists of small claims. It has been recognized by experts in property claims that approximately 75% of all property claims submitted to the insurance and risk management industry are under $25,000. Of this, approximately 50% are under $15,000 and 25% are under $10,000. There are hundreds of millions of property claims reported and settled each year totaling billions of dollars.

Typically a claim is reported to the agent or insurance company over the phone or faxed into the company. The claim is matched to the coverage and assigned to an adjuster. That adjuster will investigate the claim, document the cause of loss, confirm that the loss is covered, adjust and pay the claim, if covered. The expense associated with this process is referred to in the industry as the loss adjustment expense.

An insurance company's combined ratio is the dollar value of the loss (called severity) plus the loss adjustment expense. The industry strives for a combined ratio under $1.00, that is, for every $1.00 collected in premiums, the losses should be less than $1.00. Historically they will run $1.05 to $1.20 or higher for individual claimants. This means that for every dollar of premium collected, the insurance company is paying out $1.05 to $1.20 or higher in covered damages plus loss adjusting expense. To survive, the insurance company must control costs and provide quality claim service. Accordingly, a need exists for a better method of processing and paying claims.

BRIEF DESCRIPTION OF THE DRAWINGS

Figure 3:
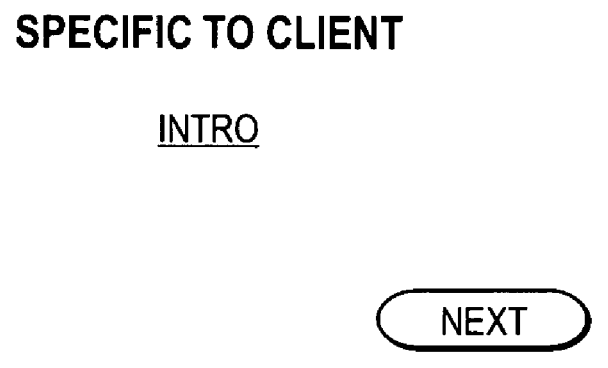

FIG. 3 is an introductory webpage that may be used by the system of FIG. 1;

FIG. 4 is a sign-on webpage that may be used by the system of FIG. 1;

FIG. 5 is a claim instructions webpage that may be used by the system of FIG. 1;

FIGS. 6–7 is a claim report webpage that may be used by the system of FIG. 1;

FIG. 8 is an emergency resources webpage that may be used by the system of FIG. 1;

FIGS. 9–10 is a building damages webpage that may be used by the system of FIG. 1;

FIGS. 11–12 is a merchandise damages webpage that may be used by the system of FIG. 1;

FIGS. 13–15 is a payroll, property damage and extra expense webpage that may be used by the system of FIG. 1;

FIGS. 16–17 is a sworn statement in proof of loss webpage that may be used by the system of FIG. 1;

FIG. 18 is a damage verification flow chart that describes steps that may be used by the system of FIG. 1;

FIG. 19 is a pay/referral process flow chart that describes steps that may be used by the system of FIG. 1;

SUMMARY

A method and apparatus are provided for processing an insurance claim. The method includes the steps of receiving a claim for a loss from an insured through an Internet connection and determining a policy type from the claim. The method further includes the steps of retrieving a set of keywords based upon the policy type, matching the retrieved set of keywords with words contained within the received claim, assigning an adjuster to the claim when any matched words of the matching step meets a predetermined criteria and paying the claim without assigning the claim to an adjuster when the matching does not meet the predetermined criteria and any auxiliary criteria.

DETAILED DESCRIPTION OF AN ILLUSTRATED EMBODIMENT

Figure 1:
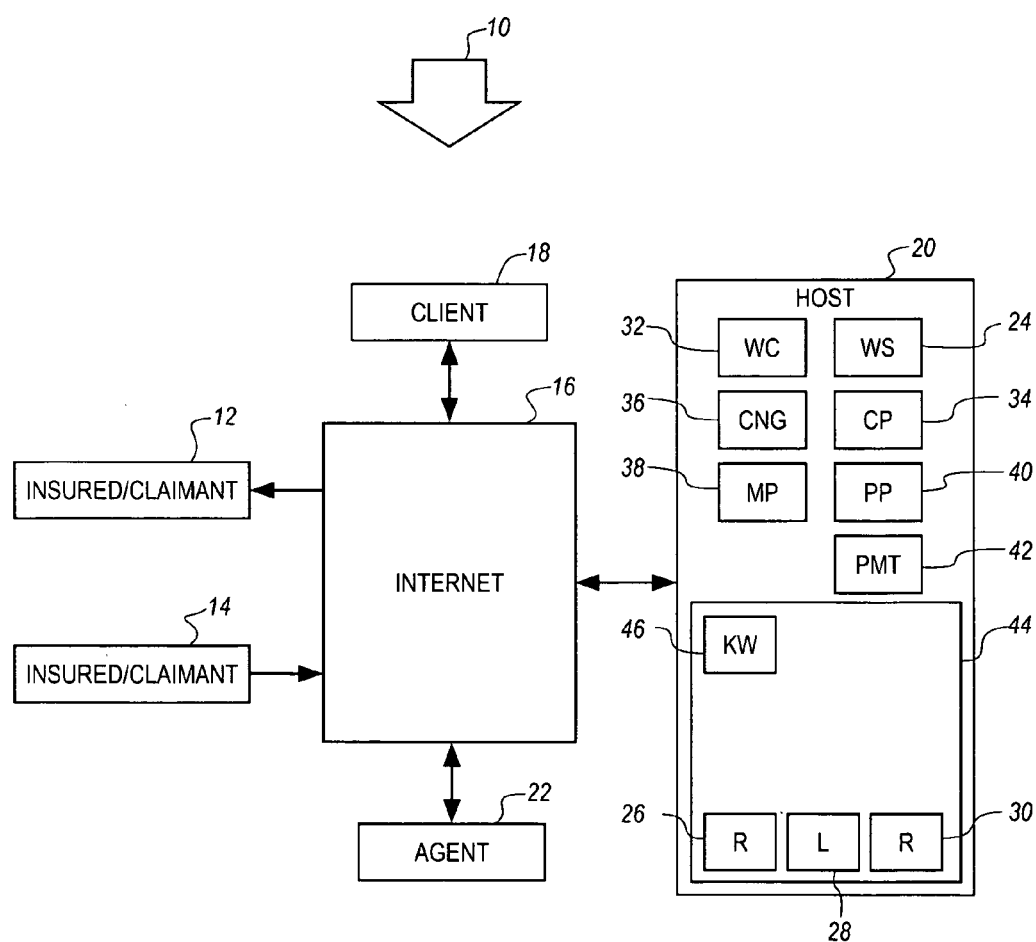
FIG. 1 is a block diagram of a system for processing insurance claims under an illustrated embodiment of the invention.
Figure 2:
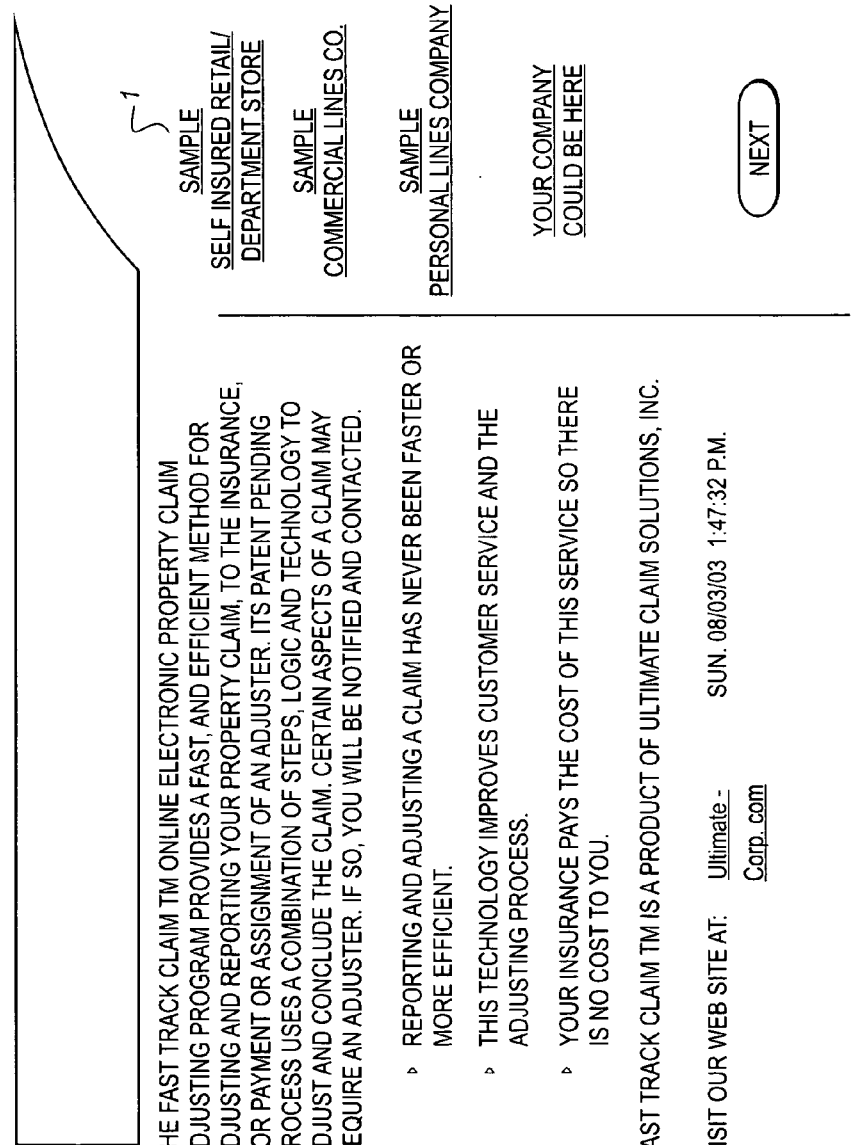
FIG. 2 is a statement of purpose webpage that may be used by the system of FIG. 1.
Figure 20:
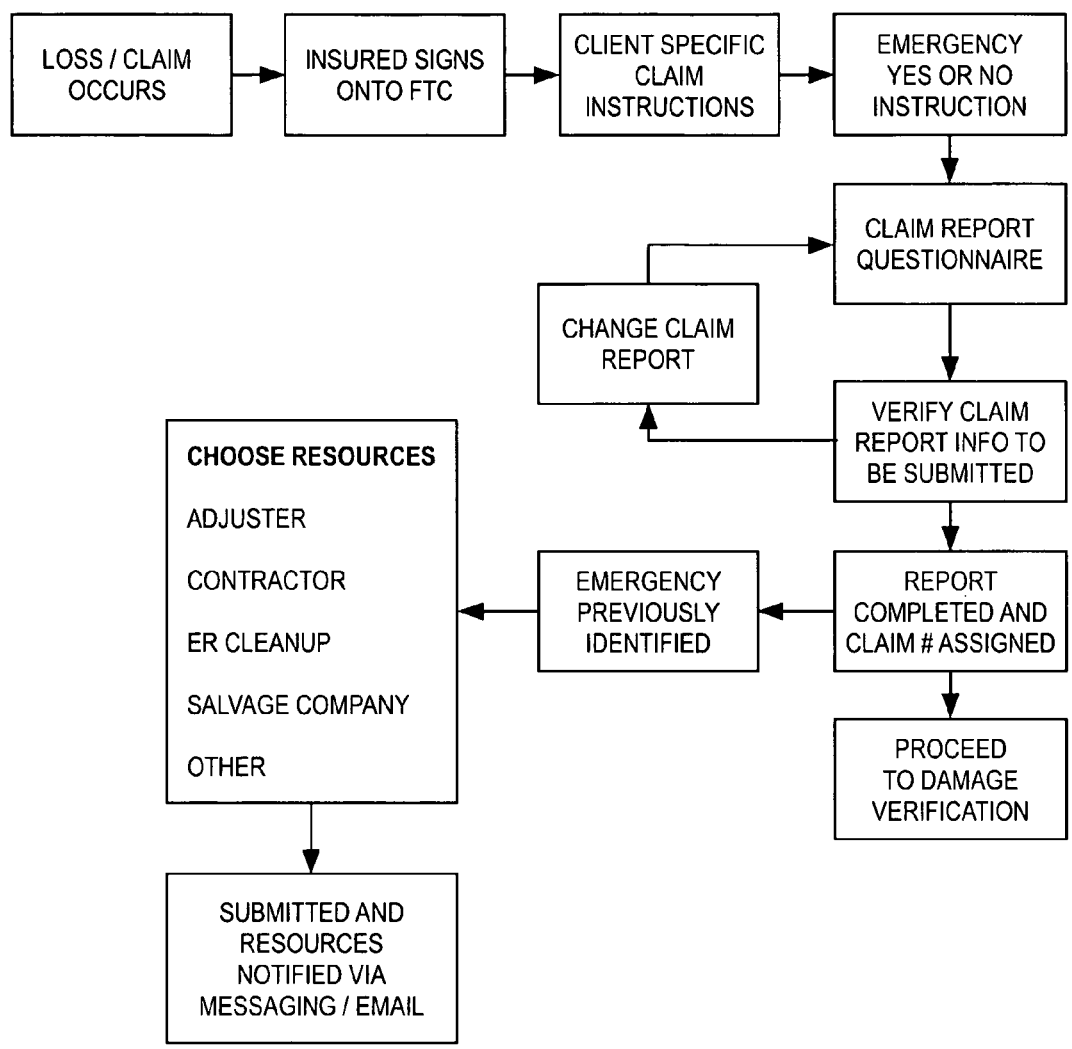
FIG. 20 is a claim reporting flow chart that describes steps that may be used by the system of FIG. 1.
Figure 21:
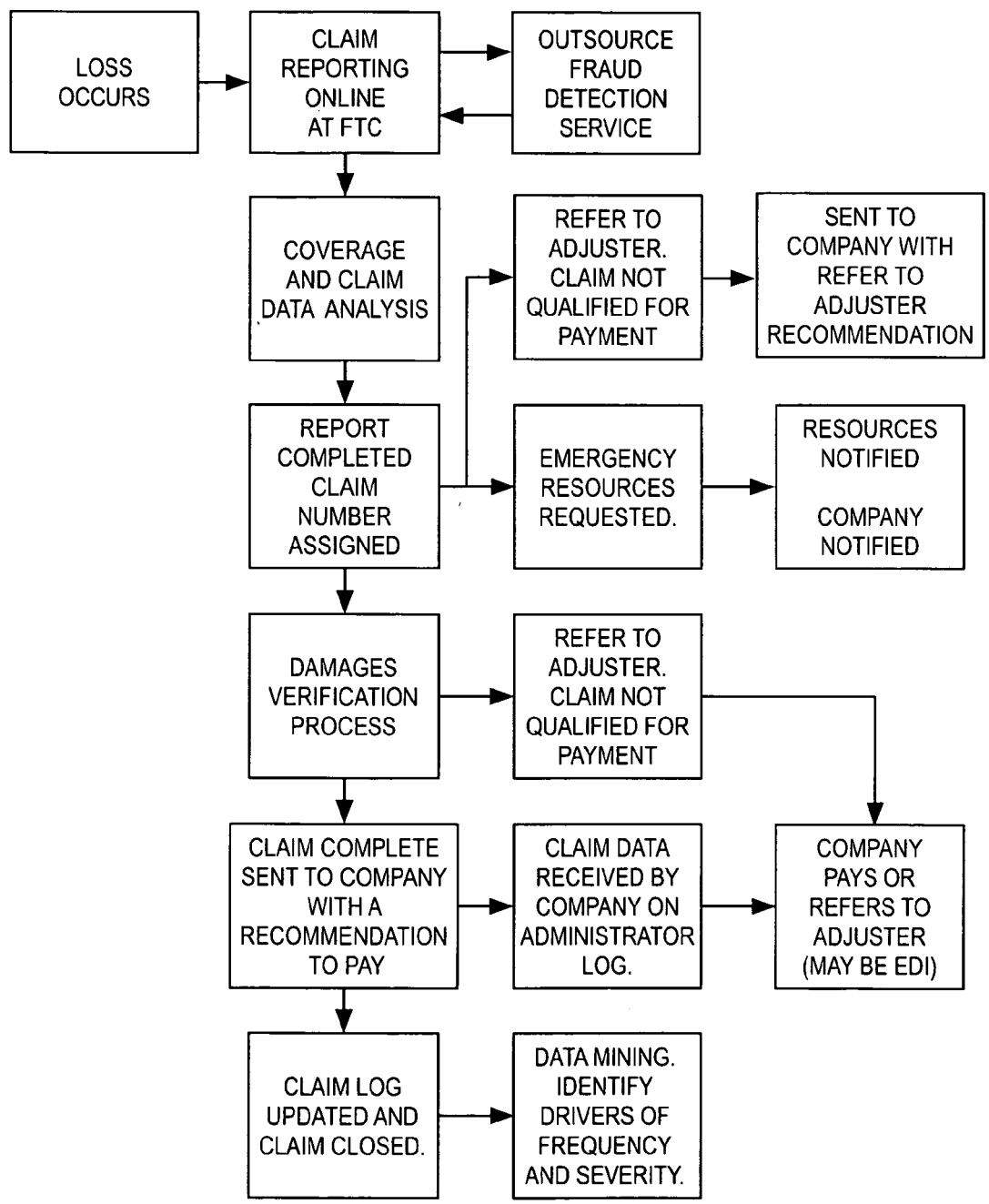
FIG. 21 is a claim process flow chart that describes steps that may be used by the system of FIG. 1.
Figure 22:
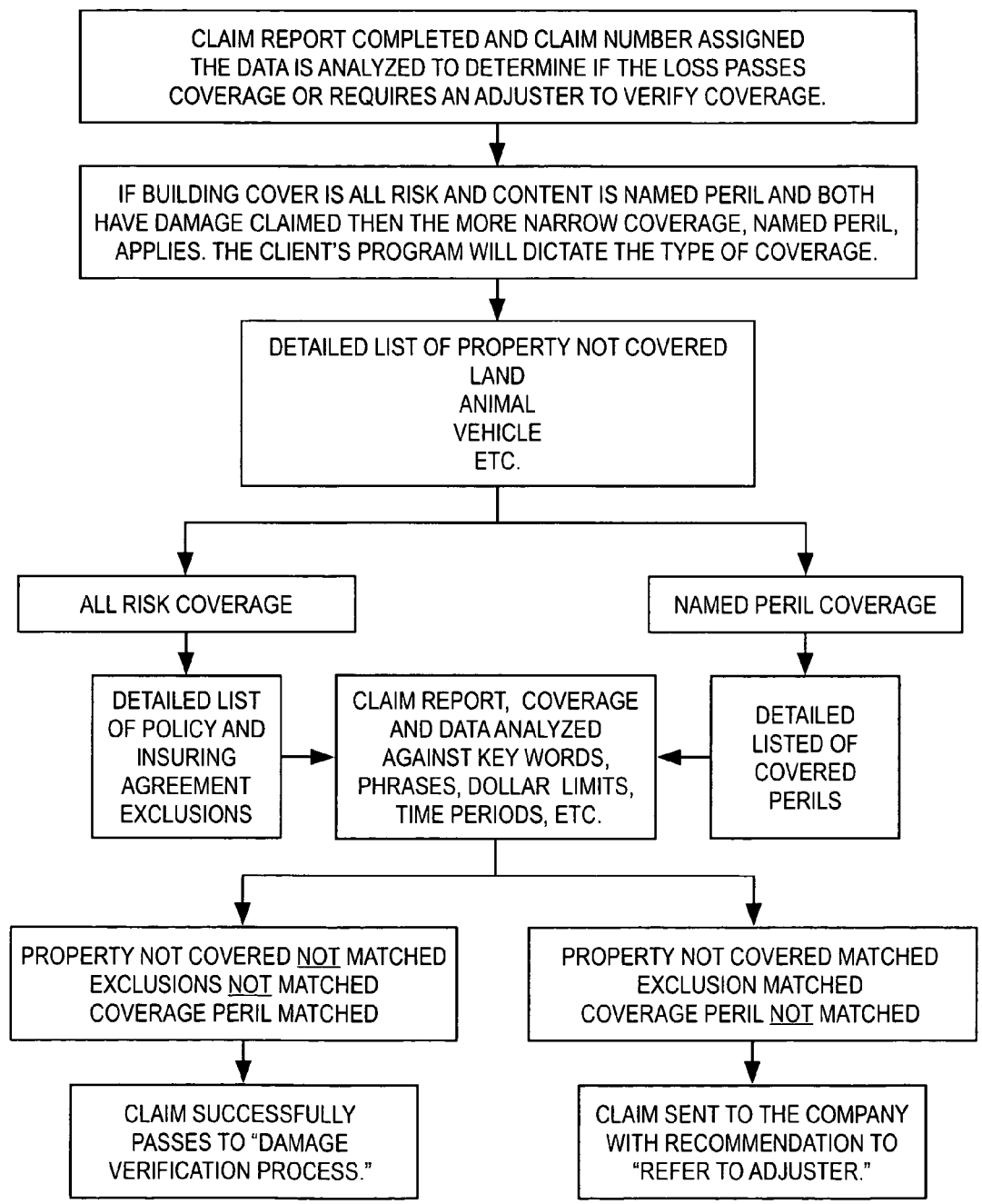
FIG. 22 is a coverage analysis process flow chart that describes steps that may be used by the system of FIG. 1.

FIG. 1 is a block diagram of the system for expediting insurance claims 10, shown generally in accordance with an illustrated embodiment of the invention. One of the advantages of the system 10 is that when a claim meets certain criteria, the claim may be paid automatically, without the involvement of an adjuster. The automatic payment of a claim is referred to herein as an "expedited claim" or as a "fast track claim". The automatic payment of claims has been found to significantly reduce insurance costs when the details of the claim can be matched to the appropriate criteria.

Under illustrated embodiments, the system 10 may be used under any of a number of different insurance formats (e.g., self-insurance, commercial line insurance, personal lines insurance, etc.) to service claims filed by claimants. It should also be understood in this regard, that while the system 10 may be used by a single client to service its claimants, the system 10 may be simultaneously used by many different clients to serve their respective claimants.

Because of the variety of clients that may use the system 10, the term "insured" will often be used interchangeably with the claimant. It should be understood that these terms and naming conventions will be used even in the case of a self-insured organization where the "insured" or "claimant" may simply be an employee of the client and payment of the claim simply results in movement of money or resources from one account to another within the same organization.

In order to service claims, a claim form made up of a number of webpages (FIGS. 2–17) may be downloaded to a claimant 12, 14. The webpages of the claim form allow the claimant 12, 14 to file a claim by entering claim information through the Internet 16. In the case where many different clients are involved, one of the identifiers needed is the identifier of the client, either by name or policy number.

Once the claimant 12, 14 has entered basic information (e.g., name, address, policy number, type of loss, etc.), the system 10 may assign a claim number. The assignment of a claim number allows the claimant 12, 14 to tender a claim proximate the time of the loss yet still access the same claim file at a later time to enter additional information (e.g., repair estimates from contractors, salvage value estimates from experts, etc.).

Once the claim has been completed, a number of processing applications within the host 20 function to evaluate the claim under a number of different criteria to either assign a claims adjuster to the claim or to pay the claim directly, without the involvement of a claims adjuster. The criteria used to evaluate the claim may be based upon the type of policy upon which the claim is based and also upon the type and magnitude of loss incurred.

Under a first criteria, key word searching of selected fields of a claim may be used as a basis for assigning (or not assigning) a claims adjuster. Under other, auxiliary criteria, claim form discrepancies or past claims from the same claimant may be used as a basis for assigning a claims adjuster to the claim.

Turning now to the use of the website 10, an explanation will be provided of the steps that may be used for accessing and using the website 10. As a first step, it may be assumed that each claimant 12, 14 is provided with a website address upon being accepted into the insurance program. The website address (Universal Resource Locator (URL)) may be provided as part of a written description of the insurance program.

Considering a self insured client first, the use of the webpages 1–10 shown in FIGS. 2–17 in this context will be considered first. The description will also assume that the self insured client is a national retail/department store organization.

It should be noted with regard to FIGS. 2–17 that the circled page numbers in the upper right corners are webpage numbers. The smaller circled numbers shown in FIGS. 2–17 are reference numbers that refer to the adjacent software keys (softkeys), interactive boxes or the content of those boxes as appropriate to the circumstances and as discussed in more detail below.

Upon entering the URL of the website 24, a first webpage (FIG. 2) of the form may be downloaded to the claimant 12, 14. The first page (FIG. 2) may be used to provide the claimant 12, 14 with a preliminary description and purpose of the website 24. Webpage 2 (FIG. 3) may server a similar purpose. Webpage 3 (FIG. 4) may provide instructions to a store manager (claimant) 12, 14.

In order to identify a criteria to apply to processing claims, the system 10 requires the store manager to enter a policy identifier (policy number) into an interactive box 5. The policy number for a self-insured client may be a store number.

Webpage 4 (FIG. 5) may provide detailed instructions. Webpage 5 (FIGS. 6–7) may be a claim report questionnaire. Webpage 6 (FIG. 8) may allow the client to request emergency response services from the client. Webpage 7 (FIGS. 9–10) allow for the entry of building damages. Webpage 8 (FIGS. 11–12) allow for entry of merchandise damages. Webpage 9 (FIGS. 13–15) allows for entry of extra expenses, such as payroll and property damage. Webpage 10 (FIGS. 16–17) is the sworn statement of proof of loss.

The processing of the claim form results in entries to three databases 26, 28, 30. The first database 26 is claim specific and may include data gathered from the online pages (FIGS. 2–17) and stored in a claim record that has been assigned a specific claim number. In this regard, each claim is assigned a unique number. For some companies (referred to as clients) the claim number may be the store number or some other number of significance.

The second database is the logging database 28. Certain data obtained from the record 26 will be maintained within the log. The client may view the log at any time to see the status of various claims collected at various times. The log 28 allows the client to search for a claim on the log by store unit number, state, date of loss, etc. Each log is client specific. The log may be for a calendar or fiscal year or for all open and closed claims for a specified period.

The third database is a report database 30. The report database 30 is associated with an interactive report generating program that allows the client to manipulate claim data and summarize this data for any specific time frame chosen. For example, a client may request a summary of data for all losses for a 36 month period by cause of loss, total dollars, subrogation, salvage, state and type of store. The report uses data from all records for the given client to extract the parameter and type of claims in the query.

Processing of claims may be performed by a criteria processor 34 under a set of general rules that also provide a basis for an auxiliary criteria that limits automatic disposition of the claim. The first general rule includes a claim frequency check. In a claim frequency check, the records of a store or unit number, loss location, manager's name and date of loss is searched. If the same store, unit number or loss location has more than three occurrences/losses in a 12 month period, then the claim cannot be adjusted electronically (i.e., cannot be paid without the approval of an adjuster) and must be assigned to an adjuster for investigation/resolution. The number of occurrences are client specific.

When the claim report (page 5) is completed, a claim number is assigned by a claim number processor 36. The claim number is assigned by a claim number generator under any of a number of different criteria. For example, a random number may be generated and used or a store identifier may be used for self-insured retail chains. The claim may be stored under this assigned claim number.

Page 4 provides, in printable format, directions for the claim report and damage pages. The client's customer is instructed how to complete the form and assess damages and what they need to provide to complete the remaining screens including entry of building damage repair costs, inventory of merchandise, payroll and extra expense. The instruction page (page 4) and damage documentation screens (pages 7, 8 and 9) can be printed off so the client's customer can have hard-copy documentation to aid in obtaining the information from outside sources that they will need to complete the claim.

Based upon the client's specified time limitation the customer can have 30, 60, 90 days or longer to gather the information and complete the claim. During this time period, the client's customer can sign onto the system 10 and enter the previously assigned claim number to recall their claim record. They can then proceed to enter the additional necessary information on each page (page 7, 8 or 9) for the damage.

Once the damage pages are completed as required, the final page, page 10, Sworn Proof of Loss must be completed. Most of the blanks on this page can be automatically or manually pulled from the claim report and damage pages to completed the document.

The client's customer must review the sworn statement of proof of loss form on page 10, the data and information being submitted and submit this data as a completed claim (see box entitled "Automatic Electronic Claim Payments" in FIG. 19). If it meets the criteria for an online adjusted claim, then a payment processing application 42 within the host may compose and forward a final e-mail with a summary of the claim data and damages that is, in turn, sent to the client's accounting department for a credit to be applied to the store's account with a debit from the risk management reserve.

If the claim has been referred to an adjuster, then the adjuster must authorize the client customer's claim. It is the adjuster's responsibility to approve the final claim and authorize payment/credit to the stores account. Once approved by the adjuster, an e-mail may be used to send the finished proof of loss and damages to the client's accounting center (see box entitled "Automatic Electronic Claim Payments" in FIG. 19). Without the adjuster's authorization the email is not sent and the claim is not paid/credited.

The client may choose the dollar threshold within which claims can be approved in the online adjusting process. In the system 10, $50,000 may be used as the default threshold. The total dollar damages estimated (item 31 on page 5) is checked against this threshold. If the loss exceeds $50,000 the adjuster is immediately notified of the claim by email, and the client's customer is notified an adjuster has been assigned.

Even when the claim damage pages are completed within the 30, 60 or 90 days as chosen by the client, if the total damages (item 295) exceed the $50,000 threshold as described above, the loss is assigned to an adjuster. This is the case even if the initial estimate (item 31) was below the threshold.

Other situations may also result in assignment to an adjuster. For example, if the loss occurs off premises (item 22) the claim is immediately assigned to an adjuster when the claim report is completed. In each case, the criteria processor 34 evaluates and determines disposition of the claim.

In general, the criteria processor 34 functions to identify situations where the context of the claim suggests the possibility of an unjustified claim or fraud. The criteria processor 34 may do this based upon a set of heuristic rules and based upon word searching. The flow charts of FIGS. 18–22 depict the overall process of claim disposition. However, even where word searching is used, word searching by itself would be of limited value because of the variety of policies and covered risks. In order to accommodate the vagaries of claims processing, a policy processing application 40 functions to identify a policy number associated with each claim. Once a policy number is identified, the policy processing application 40 may determine a type of policy involved in the claim and retrieve a set of keywords 46 from memory 44 that are associated with that type of policy.

A word comparator program 32 within the host 20 may compare each word in the "description of loss" (item 37) against a list of key words for matches. The key words may be identified based upon the policy number entered through interactive box 5. The key word can include a broad range of words to allow the program to tightly screen each claim or the set of key words can include fewer words, allowing claims to pass and be electronically adjusted without an adjuster assigned. If a key word matches any word in the description, then a matching processor 38 detects the match, transfers notification to the criteria processor 34 and the claim is immediately assigned to an adjuster. Each phrase in the key words must match exactly. For example, if the key word is "power surge", the word "power" itself will not be sufficient to cause an adjuster to be assigned. An exemplary set of key words that may be used for self-insured retail may be as follows: surge, electrical surge, power surge, ultility interruption, customer property, property in transit, shipment, missing property, lost property, customer return, product defect, defective, credit, credit card, fraud, checks, money order, war, terrorism, municipality, code, penalty, insect, animal, cracking, settling, shrinkage, deterioration, nuclear, atomic, invasion, governmental, pollutant, contaminant, shortage, mysterious, disappear, indirect and, loss of market.

The lists of damaged items (items 68–87) and description column (items 105–175) may also be compared with a list of key words for property not covered. Key words for property not covered are client specific depending upon the policy type and may be as follows: returns, customer returns, customer property, property of others, automobile, vehicle, land, leased, growing crops, property sold, property in transit, customer property, oil rig, satellites, dam and dike.

If item 35 is checked yes or chosen from a drop down indicating a third party may be responsible, then the claim is automatically assigned by the criteria processor 34 to an adjuster once the client completes the claim report. If emergency services are required as indicated by selection of any of items 39–43, then an adjuster is assigned to investigate. The criteria in this case may be client controlled to allow the client to determine at what level the adjuster is involved.

The type of loss drop down (item 20) may include the following list of losses: fire, smoke, wind, hail, vandalism, theft, burglary, robbery, employee dishonesty and other.

If employee dishonesty is chosen, then an adjuster is immediately assigned by the criteria processor 34 once the claim report is completed.

Each client may choose the dollar deductible applicable by type of loss. Deductibles can vary by the client's customer and may require client system verification. When employee dishonesty is chosen, then the deductible (item 296) is $25,000. For all other losses, the deductible is $10,000 unless changed by the client.

If the claim report exceeds the threshold time allowed by the client to complete the damage pages, then it is assigned by the criteria processor 34 to an adjuster. For example, if the time to submit damages exceeds 60 days, then an assignment of the claim is made to an adjuster.

A set of page/item rules may be considered next. Page 1 (FIG. 2) is a sign-on screen. Item 1 takes you to the self-insured sign-on screen.

Page 2 (FIG. 3) contains a client specific introduction. The icon from the fast track claim welcome screen takes you to the client's introduction page. It is proprietary to the client in style based upon that client's wants and needs for a self-insured retail or department store.

Page 3 (FIG. 4) is a secure client sign-on screen. The sign-on screen of page 3 describes and explains the self-insured program. It requires the claimant 12, 14 (client's customer) who is signing-on to check a box (item 2) agreeing to the terms and conditions of the program. They may be required to enter an access code or some other means of identification.

Item 3 is an interactive box that requests the full name of the person entering the information. This will be retained in the claim record as the person reporting the clam.

Item 4 requests the title of the person who reported the claim. This will also be retained in the claim record.

Item 5 requests the store or unit number specific to the location of loss. This is retained in the claim record and on the log.

Item 6 requests the date the loss is reported. This is retained in the claim record and on the log. Item 7 is an icon that takes the claimant 12, 14 to Page 4.

Page 4 includes claim instructions. If items in Page 3 are completed, a continue icon will take the customer to the next set of pages, which are the claim instructions.

Item 7 is an emergency icon. Selection of this icon immediately takes the client to the claim report screen, page 5. Alternatively the claimant 12, 14 can click on the emergency icon after the claim report is complete and the system 20 will notify the adjuster and others, as designated, that an emergency claim has been reported.

Item 8 is the continue icon. This allows the customer to continue to the next page, which is page 5, the claim report screen. It will not take the customer through the emergency screen.

Page 5 is the claim report. The box labeled "Unit Number" is the store number and will be saved in the log.

Item 10 requests entry of the type of store/unit. Any entered information will be included within the log. This can be a drop down menu.

Items 11 & 12 may indicate soft keys that may activate drop down menus. The drop down menus may be used to determine if the premises are owned or leased.

Item 13 requests the street address of the store/unit. Item 14 requests the city, state and zip. The city and state are may be included within the log.

Item 15 requests the e-mail address of the claimant 12, 14 reporting the clam. Item 16 requests the phone number and item 17 requests the cell phone number of the claimant.

Item 18 requests the date of loss. This is entered on the log and record. Item 19 requests a time of loss.

Item 20 may be a drop down menu. Included within the drop down menu may be a line for customer to choose various types of losses. The selection of a type of loss will go into the log. Examples include: fire, lightning, burglary, theft, robbery, water, wind, flood, vehicle, employee Dishonesty and possibly more.

Item 21 requests a location of the loss. The entered location will be compared to item numbers 13 and 14 found earlier in the claim report and if the location of loss is different then the location described in 13 and 14, the claim would be declined by the criteria processor 34 and assigned to an adjuster for investigation.

Item 22 and 23 requests information as to whether this loss occurred on or off premises. Items 22 and 23 can be a drop down menus that suggest possible scenarios for the loss. If the loss was off premises, then the claim is declined by the criteria processor 34 and assigned to an adjuster for investigation.

Items 24 thru 29 allows the claimant 12, 14 to choose whether there is building damage, merchandise damage, loss of money and securities or jewelry, additional expense, equipment and supplies or other damage. A claimant 12, 14 can chose more than one entry. Items 24–29 can be provided as drop down menus or can be more then one selection box, whatever is more efficient. Item 30 allows a narrative section where the claimant may enter other types of damages that are not already included in the boxes checked for building, merchandise, etc.

Item 31 allows the claimant 12, 14 to estimate the total dollar amount of all damages. Entry of damages may be provided as a drop down menu that allows someone to choose some dollar range (e.g., $10,000.00 to $19,999.99; $20,000.00 to $49,999.00; $50,000.00 to $99,999.00; greater then 100,000.00, etc.).

Item 32 allows entry of an emergency number. This emergency number is sent via page or e-mail to the adjuster when the emergency screen is completed and immediate contact is required.

Items 33 and 34 requests information regarding salvage. This can be a yes or no selection or drop down menus.

Items 35 and 36 requests information as to third party legal responsibility. Activation of one of these softkeys may allow for a yes or no answer or may provide a drop down menu for additional selections.

Item 37 requests a detailed description of loss. This should allow the claimant to enter information regarding the specifics of who, what and why about how the loss occurred.

Item 38 is a softkey that allows a transition to the next webpage. Upon activating the softkey 38, the claim is saved and assigned a claim number, once this and the previous pages have been accurately completed. It takes the claimant 12, 14 to the next screen.

If the Emergency Box was checked on page 4 of the claim instructions, then the claimant 12, 14 is transferred to page 6, which is the emergency resource request page. Otherwise, the claimant 12, 14 is transferred to page 7, if building damages were indicated. Alternatively, the claimant 12, 14 is transferred to page 8 if merchandise damage was indicated or page 9 if payroll, extra expense or other property damage were indicated. If more than one category was entered on items 24 thru 29 the claimant is transferred thru these damage screens sequentially.

Once the claim report is complete and emergency contact is sent, some claims are declined for online adjusting and must be handled by an adjuster. The client may request all claims be completed online as opposed to just those being adjusted electronically.

Those claims assigned to the adjuster will require an adjuster authorization/approval once the client's customer submits the online information for damages. All claims reported may remain in a pending or open status for a specified time, 30, 60, and 90 days, or longer. A previously assigned claim number can be referred to later by the claimant 12, 14 to allow the claimant to come back online and complete various damage screens to conclude and submit the claim online for settlement.

Page 6 is for emergency responses. Item 39 is an adjuster box softkey that may be selected for serious or large losses. The Adjuster Box 39 may be checked and the claim is reported by pager to the adjuster with the emergency cell phone number of the claimant 12, 14.

Item 40 identifies a softkey that alerts the system 10 in the case where a claimant needs emergency services for water, fire or smoke restoration. Activation of box number 40 causes the emergency cell phone number of the claimant to be sent to an adjuster by pager.

Item 41 identifies a softkey that alerts the system 10 that salvage teams are needed to remove damaged merchandise. The cell phone number of the claimant is sent by pager to the adjuster.

Item 42 identifies a softkey that alerts the system 10 that an investigation and expert are needed (especially if others may be legally responsible for property damage). Again, the cell phone number of the claimant is sent by pager to the adjuster.

Item 43 is a softkey that alerts the system 10 that a building contractor or construction team is needed. The adjuster is notified by pager.

Item 44 is a SUBMIT softkey that initiates any needed emergency activity. If the SUBMIT icon is activated, then support services targets of all the boxes, 39–43, which were previously checked will receive an e-mail or page advising them of the emergency number that was collected from the claim report Item No. 32. It may also send an e-mail to the claimant 12, 14 at the e-mail address that they provided in the claim report advising them that the emergency claim report of damage was received and they will be contacted shortly. If the claimant does not hear from somebody shortly, then they may be given an alternative phone number that they can call in an emergency.

If from the claim report, the claimant clicks NEXT and in the claim instruction page, the claimant did not identify the claim as an emergency, then the system 10 would take the claimant to the damage pages. The progression from the damage pages depends upon what was identified as being damaged in the claim report, items 24 thru 30. For example if the building (item 24) was damaged it would start with page 7.

If the Merchandise Box (item 25) were checked on the claim report, then the system 10 would progress to the merchandise damage screen, which is page 8. If extra expense, payroll or property damage are involved such as indicated by activation of Box 28 or 29, the system 10 would proceed to page 9 for entry of extra expense, payroll and property damage. Otherwise, page 9 would not be presented to the claimant. This follows for each class of damage with a specific page necessitated by entry of additional information.

Page 7 is for building damage. Items 46–53 are softkeys that allow entry of descriptive information regarding what is damaged on the building.

Item 54 is an interactive box that allows entry the store number and/or the claim number specific to the client. Item 55 is a interactive box that allows entry of the job number assigned for building repairs by the client.

Item 56 is a interactive box that allows entry of the total estimated building damages. This is not the amount claimed.

Item 57–59 may be drop down menus to determine if customer has an estimate. If the claimant enters yes or, later, when the claims has collected estimates, pending items 60–66 are prompted. If no, the customer receives information to contact a contractor.

Items 60–66 are contingent on the answer to the item 57 softkey. If the softkey 57 is not activated, interactive boxes 60–66 are not presented.

Item 67 is a drop down menu that requests information about ownership of the building. If there are building damages and the building is leased, then the claim is assigned out to an adjuster to determine responsibility under the written lease. If owned, the customer continues. This is a required field. The drop down menu may also have an "unknown" where the customer does not know if it is leased or owned. If unknown is chosen, then it is treated as being leased and assigned out for an adjuster.

Items 68–87 are interactive boxes that request loss information. The boxes 68–87 are used by the customer to list damage and cost to repair.

Item 88 requests information regarding total building damages, as itemized in items 68–87. This estimate is entered into the log.

Item 89, 91 & 92 are interactive boxes that requires information regarding consultants. In these boxes the claimant must identify any project consultant including their name, phone number and email.

Item 90 requires the customer to agree to repair the damages. This is a required item that must be checked to continue.

Item 93 is the NEXT button that causes presentation of the claim form to proceed to the Merchandise Damage (page 8), if merchandise has been identified on the claim report (page 5, item 25). If not, then the page presentation goes to Payroll (page 9), if payroll was identified on page 5 item 28. Otherwise, it proceeds to the Sworn Statement, page 10.

Page 8 is for merchandise damage. Items 94–98 are sofkeys that are used to list the type of merchandise damaged. Item 97 is an interactive box that lists the store and/or claim number. Each page will always have the claim number for the claim being established.

Items 99–104 are softkey boxes that allow entry of salvage information through a series of questions and rules. Alternatively, items 99–104 may be drop down boxes with rules. If item 99 is yes, then item 101 must be yes and Item 41 on the Emergency Response page must have been indicated and submitted. If item 100 is no, then item 102 must also be no. If item 103 is yes then the column the labeled "markdown" will apply in items 105 through 174. If item 104 is entered as no and the customer attempts to enter a percentage in the markdown column, then they will receive an error massage stating no merchandise was sold with a markdown. If they enter 103 as yes and they attempt to leave the markdown column blank, then they will be prompted with an error message that states a markdown percentage must be entered for all damaged merchandise retained and sold with a markdown.

Items 105–175 are interactive boxes that may be used by the customer to enter information about damaged merchandise. It requests the division, description, quantity, sell price, markdown, cost and amount claimed. The information from these columns are used together to determine the amount claimed. The sell price is multiplied by the mark down to determine the cost. Depending on the client's instructions, merchandise can be claimed at cost or selling price. Under one mode of operation, the system 10 values the claim for merchandise at cost. Clients may chose sell price or cost.

Item 176 is a softkey that allows the claimant to agree that the valued allowed is the lower of cost or the markdown. If cost is claimed, then the damaged merchandise must be given to an approved salver. Another column may be provided asking if merchandise was damaged and given as salver. In this case, the cost of the merchandise is allowed. If damaged and sold "as is" with a markdown, then only the value of the markdown is allowed.

Activation of Item 177, the "NEXT" softkey, continues the page presentation and causes the page presented to proceed to Payroll, Property and Extra Expense (page 9), if these types of damages are applicable to this claim. If not, page progression goes to the Sworn Statement in Proof of Loss (page 10).

Page 9 is for payroll, property damage and extra expenses. Item 178 is the claim number, again this is on every page.

Items 179–229 allows the claimant to provide information about Payroll. The information from the columns for Rate and Hour should are multipled and should equal the sum in the total column. The information from the total column is added and placed in the total box as item 229.

Interactive boxes 230–255 allow the claimant to provide information about Property damage. The cost column should add up to equal the total in box 255.

Interactive boxes 256–281 allow the claimant to provide information about extra expenses. The column for cost adds and totals in box 281.

The totals for each category of damage in webpage 9 is carried forward in the summary of expenses. Payroll total 229 is reiterated in item 282, property damage total in item 255 is reiterated in item 283 and extra expense total 281 is reiterated in item 284. Then items 282, 283 and 284 are added and totaled in item 285.

Box 286 requires that the claimant 12, 14 indicate and agree that all costs have been incurred and paid. If it is not checked, then the claim cannot continue with the "NEXT" icon.

Item 287 is the "NEXT" icon and this will take the claimant 12, 14 to the final document for the claim. Page 10 is the sworn statement of proof of loss. In item 288, the store number carries over and is also used as the claim number. Item 289 is the same as item 20 from the claim report found on page 5.

Item 290 is the same as item items 18 and 19 from the claim report found on page 5. It shows the date and time of the loss.

Item 291 is the same as item 37 on the claim report found on page 5. This provides a detailed description of the loss. The word "is" as the end of this item can be deleted.

Item 292 is the same as total building damages found in item 88 on page 7. It carries forward.

Item 293 is the same as the total content damages item 175 found on page 8. It carries forward.

Item 294 is the same as total payroll, property damage and extra expense item 285 found on page 9. It carries forward.

Item 295 lists the total of all damages. This item contains the totals found in items 292, 293 and 294.

Item 296 is taken from the General Rule 16 for deductibles. If the claim is for an employee dishonesty type loss as indicated on item 20 of the claim report found on page 5, then the deductible is $25,000. If the claim is any other loss, then the deductible is $10,000. The clients choose the deductible based on their own program.

Item 297 identifies the net claim and is determined by subtracting the deductible, item 296 from the total damages, item 295. The result is entered in item 297.

Item 298 requires the claimant 12, 14 to certify to the validity of the claim. A check mark in this box 298 has the same force and effect of a signature. An interactive box may also be provided where the person is required to type in their name and e-mail address.

The final icon is SUBMIT. The claim report with the damage pages and proof of loss are e-mailed to the client's accounting department and others as identified on the distribution list (see box entitled "Automatic Electronic Claim Payments" in FIG. 19). Additionally, the person that agreed to the terms, item 298, and entered their name and e-mail address may also be on the distribution list.

The use of the system 10 by a client offering commercial lines insurance will be considered next. For ease of explanation, only the differences in operation of the system 10 in handling claims between self-insured clients and commercial line clients will be discussed.

In this regard, webpages 1–10 may be used for commercial line insurance in a manner similar to the self-insured context. In addition, databases 26, 28, 30 may be used in a similar manner.

With regard to general rules, when the claim report (page 5) is completed, a claim number is assigned. The claimant 12, 14 is allowed to continue at this point to enter damages on the applicable pages or may come back within a specified time allowed by the client to complete the damage pages. As above, page 4 provides, in printable format, directions for the claim report and damage pages. The client's customer is instructed how to complete the form and assess damages and what they need to provide to complete the remaining screens including building damage repair costs, inventory of business personal property, business earnings and extra expense.

Based upon the client's specified time limitation the insured/client's customer have 30, 60, 90 days or longer to gather the information and complete the claim. They may complete the damage pages while currently online or come back and complete the pages within the time allowed by the client. During this time period, the client's customer can sign onto the system 10 and enter the claim number to recall their claim record. They can then proceed to enter the necessary information on each page (page 7, 8 or 9) for the damage.

If the claim has been referred to an adjuster, then the claim is closed and the record is marked as referred to an adjuster. The claim, once referred to an adjuster, cannot be referred back to the system 10 for adjustment. The claim is closed on the system 10.

Although there may be some clients that would like to retain the claim online on the system 10 for the adjuster to complete, it is not considered essential to the system 10. As such, the system 10 allows paperless claims and virtual information on the status of the claim to be retained and processed.

The client must choose the dollar threshold within which a claim can be approved in the online adjusting process. In this case, the system 10 may use $10,000 as this threshold. The total dollar damages estimated (item 31 on page 5) is checked against this threshold. If the loss exceeds $10,000 the adjuster/client is immediately notified of the claim and the client's customer is notified an adjuster has been assigned.

When the claim damage pages are completed within the 30, 60 or 90 days as chosen by the client, if the total damages (item 295) exceed the $10,000 threshold as described above, then the loss is assigned to an adjuster. This is the case even if the initial estimate (item 31) was below the threshold.

With regard to key word searching, commercial lines insurance proceeds somewhat differently. In the commercial line situation, if only building damages are claimed, then the list of key words is different than if business personal property (BPP) damages are also claimed and included (building and BPP). This may also vary by policy prefix. By this it is meant that some policies (identified by a prefix e.g. CBX) will only use List A with regard to the building and business personal property (BPP) damages. Other policy prefix types may require a different list of key words. In this case, a List B may be used.

"Building damage keywords are List A. Business Personal Property (BPP) damage is List B. For List A (Building)

if a key word for the list matches any word in the Description of Loss (item 37) the claim is immediately assigned to an adjuster. For List B (Business Personal Property Damage Only or Building and BPP Damages) if a key word is not present in the Description of Loss (item 37), then the loss is assigned to an adjuster. How the lists apply will depend of the policy number prefix and clients policies sold to its customers. Essentially it is the application of all risk coverage or named peril.

The system 10 may get a claim for a policy prefix that is identified not to use List A, but only have building damages. As such, List A would still be used because building damages are subject to all risk coverage. If business personal property damage were added to the claim, then List B would then have to apply (requiring words to match) to avoid assignment to an adjuster. Business Personal Property is subject to named peril coverage.

For example a claim is submitted with a policy prefix not recognized to only use List A. However, only building damages (Bldg.) are claimed, (no business personal property). As such, List A would be used.

In another example, a claim has both Building and BPP damages claimed and the policy prefix is not listed indicating to only use List A, therefore List B will apply. List B requires one of the keywords in List B to be in the description of loss (item 37). If not, and there is no match, then the loss is assigned to an adjuster after recording the information on the claim. If a word in the description of loss (item 37) matches the List B keyword, then the claim continues to be adjusted electronically.

As an example, List A may include a set of key words as follows: surge, electrical surge, power surge, power failure, utility interruption, ordinance, law, earthquake, quake, flood, surface water, waves, pump, sump pump, property in transit, shipment, missing property, lost property, lost, missing, neglect, intentional, defective, maintenance, credit card, fraud, checks, money order, war, terrorism, municipality, code, penalty, insect, cracking, settling, cracking, bulging, expansion, shrinkage, wear, tear, wear and tear, vacant, mechanical, mechanical breakdown, smog, animals, birds, under construction, rust, corrosion, deterioration, nuclear, atomic, invasion, governmental, pollutant, contaminant, shortage, mysterious, disappear, indirect, sewer backup, sewer, sewage, drain backup, backup of sewer, backup of drain, mold, fungus, wet rot, dry rot, rot, rotten, converted, volcanic, bacteria, mud, mudslide, nesting, infestation, rodents, electrical, temperature, change in temperature, boiler, steam, turbine, improper construction, faulty and seepage. In contrast, List B (words must match or claim is referred to an adjuster) may be as follows: fire, lightning, wind, windstorm, hail, storm, explosion, riot, civil, civil commotion, aircraft, plane, vehicle, car, smoke, vandalism, mischief, malicious mischief, theft, falling, weight of ice, weight of snow, water or freezing.

The type of loss drop down (item 20) may include the following list of losses: fire, smoke, wind, hail, vandalism, theft, burglary, robbery, employee dishonesty and other.

Employee dishonesty is applicable to a commercial lines claim. Once the claim report is completed the claim is assigned to an adjuster to investigate due to legal issues (denial, etc.) and the fact that the employee may be responsible for reimbursement.

The client's customer enters the deductible amount. On commercial lines type policies this can be $100 to $10,000 or higher and can vary incrementally. If a zero deductible is chosen, then the loss should be assigned to an adjuster. Each client will provide parameters for the deductible to be entered by their customer.

Turning now to webpages 1–10 (FIGS. 2–17), an explanation will be provided as to the differences in appearance and function between self-insured and commercial lines insurance. For example, a commercial lines insured may enter a URL of the website 24 for commercial lines insurance and be presented with page 1 (FIG. 2) that displays an identifier of the client.

For commercial lines insurance, page 2 (FIG. 3) may be used as an introduction screen. Page 2 may state the following unless changed by a client.

"Our customers, insureds and agents, may now report a claim online to be immediately adjusted, paid and closed, if possible. Some claims may require additional information or adjustment before they can be concluded. If so, you will be contacted by an adjuster. Please enter your policy number and name as it appears on your policy."

Page 3 (FIG. 4) may contain a client specific introduction. The icon from the introductory screen (FIG. 3) takes the insured to the client's sign-on screen. It may be proprietary to the client in style based upon that client's wants and needs for a Commercial Lines insurance company. It may provide specific information to file the claim, as follows.

Commercial Lines Insurance Company

Please report your claim by completing the online claim report questionnaire. Once completed a claim number will be assigned and provided to you to complete your claim. You may continue on and complete the damage section now. However, you have 30 days to gather information about your damages and complete the online claim.

For building damages you should obtain and estimate the cost to repair or replace the damaged property. You may know some of the material if you intend to do repairs yourself, allowing a reasonable charge for your own labor. If you need a contractor you may search on the list of approved contractors in your area, or obtain one of your own choosing. For the estimate you will need to provide the breakdown of cost online.

For business personal property, also referred to as contents, you will need to list each item, its description; age by month and year, original cost and cost to replace today. To obtain replacement cost at this time, before replacing, you must agree to comply with the policy conditions that require you to replace the property. As such, you must agree online that the property will be replaced.

If you have incurred loss of business earnings and/or extra expense. That is expense to continue normal operations had no loss occurred or expediting expense to get back into business more quickly you must itemize the cost/expense you have incur. These expenses must be over and above your normal everyday operating expenses. If you will require and extended time indicate this so an adjuster can contact you as soon as possible.

Business earnings losses typically require an adjuster to work with you to determine the amount claimed and recoverable under your policy of insurance. If you were closed only a few hours or one or two days and the loss is not extensive you may claim that amount without an adjuster. Or if your policy has a set limit for each days your business is closed you may claim that amount.

Should you have questions please use the toll free number or contact us by email. Once the claim report and damages are reported and acknowledged your claim may be adjusted and concluded online or an adjuster will be assigned. You will be notified immediate if an adjuster is assigned.

In general, the client's secure page (FIG. 4) describes and explains the client's Commercial Lines program. It requires the claimant (client's customer who is signing on) to check a box (item 2) agreeing to the terms and conditions of the program. This will be required in addition to the name and relation to the named insured to continue.

Item 3 allows the claimant to enter their full name as the person entering the site and completing the claim form. This will be in the claim record as the person reporting the claim.

Item 4 requires the person reporting the claim to enter the relationship to the named insured. A drop down box may be provided for selecting the relationship (e.g., as the named insured, the owner, manager, partner, insurance agent, etc.). This will also be in the claim record.

Item 5 allows the claimant to signify whether this is a new claim or follow-up on an existing claim. If new, it takes the customer to the claim instruction page. This is retained in the claim record and on the log.

Item 6 allows the claimant to enter the date the loss is reported. This is retained in the claim record and on the log. Following the completion of page 3, the claimant activates the NEXT icon (item 7) and proceeds to page 4.

Page 4 operates substantially the same as in the self-insured context. Page 5 differs in the format of the enter information.

For example, Item 9 allows for the entry of a policy number. In this regard, most policy numbers have two parts, a prefix and a number. e.g. PRO 00223547. This is client specific and is used by the client to identify their insured.

Item 10 allows entry of the effective date of the policy. This date must be after the date of loss, item 18, or the claimant will be asked to confirm that the date is correct. If the claimant indicates that the entered date is correct and is before the date of the policy, then the loss will be assigned to an adjuster.

Items 11–20 are used substantially the same as the self-insured lines. Item 20 may be a drop down menu that allows the customer to choose various types of loss. This type of loss will go into the log. The types of loss may include fire, lightning, burglary, theft, robbery, water, wind, flood, vehicle, vandalism, smoke, employee dishonesty and other.

Item 21–23 are used substantially the same as the self-insured model. Items 24–29 are used somewhat differently.

Item 25 would be changed to read "Business Personal Property". It allows the claimant to choose whether there is building damage, business personal property, money/securities, business earnings and extra expense, or other damage. It can be a drop down menu. More then one box may be checked. Item 27 is changed to read Business Earnings, item 28 is changed to read Extra Expense, and item 29 is changed to read Other which, in turn, can be described in box 30.

Item 30 provides a narrative section where the person filling out the form can enter other types of property damages that are not already included in the boxes checked for personal property, jewelry, etc.

Item 31 allows the claimant to estimate the total dollar amount of all damages. This is important and may be provided as a drop down that allows the claimant to choose a dollar range (e.g., 1 to 1000; 1001 to 2,500; 2501 to 3,500; 3,501 to 5,000; 5001 to 7,500; 7,501 to 10,000).

Items 32–37 are used in a similar manner to that of the self-insured model. Item 38 is used somewhat differently.

When item 38 is activated, the claim is saved and assigned a claim number assuming that this page has been accurately completed. It takes the claimant to the next screen. If the Emergency Box was checked in the initial page from the claim instructions, then the next page that it takes the claimant to is page 6, which is the emergency research page. Otherwise it takes the claimant to page 7, if building damages were indicated, page 8 if business personal property was indicated or page 9 if business income and extra expense were indicated. If more than one category was entered on items 24 thru 29, then it takes the claimant thru these damage screens sequentially.

Once the claim report is complete and emergency contact is sent, some claims are declined for online adjusting and must be handled by an adjuster. The client may request all claims be completed online as opposed to just those being adjusted electronically. For commercial lines, this will require a substantial database. Once the claim is assigned to an adjuster, the data and future claim information goes with the client and the claim on system 10 is closed and marked assigned to adjuster.

Those claims assigned to the adjuster and retained on the system 10 will require an adjuster authorization/approval once the client's customer submits the online information for damages. All claims reported may remain in a pending or open status for a specified time, 30, 60, and 90 days, or longer. A claim number is assigned at this point and can be referred to later by the claimant to come back online and complete various damage screens to conclude and submit the claim online for settlement.

Page 6, items 39–44 are used substantially as described for the self-insurance model. However, if Business Personal Property (item 25, 26, 27, 29 and 30) were selected on the claim report, then the claimant would get the business personal property damage screen, which is page 8. If business earnings and extra expense is involved (e.g., Box 28 is selected), page 9 must also be completed. This follows for each class of damage with a specific page.

Page 7 is used substantially as described for the self-insured model. However, item 93 is the NEXT button and, when selected, causes the claimant to go to the Business Personal Property Damage (page 8) if business personal property has been identified on the claim report (page 5, item 25). If not, then the claimant it taken to Business earnings and Extra expense (page 9) if has been identified on page 5 item 28. Otherwise, it proceeds to the Sworn Statement, page 10.

Page 8 is used somewhat differently. For example, items 94–98 may be relabeled as follows; item 94 is labeled Merchandise, item 95 is Equipment, item 96 is Office Furniture and Equipment, and item 98 is Other.

Item 97 lists the claim number. Each page will always include the assigned claim number for the claim. One claim number will be used for each occurrence/claim reported and each claim may include damages such as building, business personal property and business earnings and extra expense.

Items 99–104 identifies salvage through a series of questions and rules. In business personal lines, the claimant is asked if there is salvage. If yes, a salver needs to be notified and the claim is assigned to an adjuster if the client doesn't wish to use salvers direct.

Items 105–175 are used by the customer to enter information about damaged business personal property. The columns and column headings for all merchandise from the self-insured program are deleted. In its place is the Property Damage section from Self-Insured Items 230 thru 255. Business Personal Property is now the property damage section exactly as it was under the self-insured model. In this area, the claimant can enter all business personal property including tenant improvements in a leased facility. The item number 175 Total Business Personal Property is carried forward to the Sworn Statement in proof of Loss, page 10.

Item 176 requires the client to agree to replace the business personal property in accordance with the policy terms and conditions that require replacement in order to collect replacement cost coverage. Verification of replacement is difficult. Therefore the client's customer must enter his acceptance via item 176, replacement of property. The wording for the agreement is changed to require acceptance of this condition.

Item 177 "NEXT" continues and takes the claimant to Business Earnings and Extra Expense (page 9), if these types of damages are applicable to this claim as previously selected on the claim report. If not, the claimant is taken to the Sworn Statement in Proof of Loss (page 10).

Page 9 is used somewhat differently. Item 178 is the claim number. Again, this is on every page.

Items 179–229 falls under the Extra Expense heading found in items 256 thru 280. In the Commercial Program, Payroll is part of extra expense category of damages and should read Extra Expense—Payroll. If Business Earnings is claimed, then payroll would not be allowed, as it is a continuing expense and part of the business earnings calculation.

Items 230–255 the wording of the previously used Property Damage is changed for commercial lines to read Business Earnings. The columns and heading titles also change. The first column will recite the question "How long has the business been totally or partially interrupted?" An entry box next to the question will provide a drop down menu for business hours and business days and then an interactive box for the claimant to enter the amount of time. For example, 3 business days. The next question will be "How much of the estimate was lost in net income?" A box to enter a dollar amount is provided. Business Earnings is a very difficult area of damage and some clients may require any claim of business earnings loss to be assigned to an adjuster. Others may allow small claims, under $1,000 for lost business earnings. In the system 10, $2,500 may be allowed for business earnings before the loss is assigned out to an adjuster.

Other clients may have programs that allow a Valued Daily Limit (VDL) for business income. For example, the policy has a VDL of $1,000 per day. This means the client will pay $1,000 per day for up to 30 days loss of business income when the business is closed due to damage or destruction of the building or business personal property by a covered cause of loss. As such, a client may claim the business was shut down for three days at $1,000 per day for a $3,000 total business earnings loss. Some clients may have a Valued Daily Limit. If so, a per-day allowance may be allowed without the assignment of an adjuster. The system 10 multiplies the per-day allowance by the number of days down and calculates a total value. Alternatively, the system 10 takes the hours of a day (say 4 hours were lost or half a day) and allows a proportion of a day, in this case 50%. If a valued daily limit is not used, then a net income per day times the number of days lost may be used to get the business earnings loss.

Items 256–281 provide information about Extra Expense. The heading "Acct. No." can be changed to "Incurred" or "Estimated", the claimant must choose one of the two categories. The client may require all claims with estimated extra expense over a certain dollar parameter be reported to the company for an adjuster to be assigned. The system 10 may allow up to $2,500 estimated or incurred extra expense before the claim is assigned to an adjuster.

The total for Business Earning, Extra Expense and Payroll Extra Expense is calculated and transferred to the Summary of Business Earnings and Extra Expense and totaled. That total in item 285 is carried forward to the Sworn Statement In proof of Loss on page 10. Page 10 is used substantially as described for the self-insured model.

The use of the system 10 by a client offering personal lines insurance will be considered next. For ease of explanation, only the differences in operation of the system 10 in handling claims between self-insured clients and personal line clients will be discussed.

In this regard, webpages 1–10 may be used for personal line insurance in a manner similar to the self-insured context. In addition, databases 26, 28, 30 may be used in a similar manner.

With regard to general rules, the claim frequency check may be somewhat different. In this regard, the system 10 may search the insured's name, loss location, other names and date of loss. If the same insured or loss address/location has more than three occurrences/losses in a 12 month period, then the claim cannot be adjusted electronically and must be assigned to an adjuster for investigation/resolution. The number of occurrences are client specific. All claims will be referred to an outside service/database for a fraud check. If the claim is immediately assigned (does not meet fast track parameters) to an adjuster, then the fraud check will still be completed and the results reported to the client.

When the claim report (page 5) is completed, a claim number is assigned. This is recorded in the claim record. Page 4 provides, in printable format, directions for the claim report and damage pages. The client's customer is instructed how to complete the form and assess damages and what they need to provide for completion of the remaining screens. Damages may include building damage repair costs, inventory of contents/personal property and additional living expense. The instruction page (page 4) and damage documentation screens (pages 7, 8 and 9) can be printed in hard copy so the client's customer (the insured) can have documentation to help obtain the information they will need to complete the claim.

Based upon the client's specified time limitation the insured/client's customer have 30, 60, 90 days or longer to gather the information and complete the claim. During this time period the client's customer can sign onto the system 10 and enter the claim number to recall their claim record. They can then proceed to enter the necessary information on each page (page 7, 8 or 9) for the damage.

Once the damage pages are completed as required, the final page, page 10, Sworn Proof of Loss must be completed. Most of the blanks on this page can be retrieved automatically or manually from the claim report and damage pages to complete the claim document.

The client's customer (the insured) must review the sworn statement in proof of loss on page 10, the data and information being submitted and submit this data as a completed claim. If it meets all criteria for an online adjusted claim, then the payment request with summary of the claim data and damages is sent to the client's claim department in a batch transmission. Protocol for transmission may be established with client. Once the claim is transferred to the client, the claim is closed and its status is saved in the record; i.e. referred for adjustment, payment requested, pending, closed at insured's request.

If the claim has been referred to an adjuster, then the claim is closed and the record is marked as referred to an adjuster.

The claim, once referred to an adjuster, cannot be referred back to the system 10 for adjustment.

The client must choose the dollar threshold within which a claim can be approved using the online adjusting process. The system 10 may use $5,000 as this threshold. The total dollar damages estimated (item 31 on page 5) is checked against this threshold. If the loss exceeds $5,000, then the adjuster/client is immediately notified of the claim and the client's customer is notified that an adjuster has been assigned.

When the claim damage pages are completed within the 30, 60 or 90 days as chosen by the client and the total damages (item 295) exceed the $5,000 threshold, as described above, the loss is assigned to an adjuster. This is so even in the case where the initial estimate (item 31) was below the threshold initially.

If the loss occurs off premises (item 22) the claim is immediately assigned to an adjuster when the claim report is completed.

The system 10 runs each word in the "description of loss" (item 37) against a list of key words. The client can choose the key words by the type of policy they offer. Those key word can include a broad range of descriptive terms to allow the program to tightly limit the automatic payment of each claim or it can include a very limited number of words, allowing claims to pass and be electronically adjusted without an adjuster assigned.

In the personal lines example, if only building damages are claimed, then the list of key words is different than if personal property damages are also claimed and included. This may also vary by policy prefix. By this it is meant that some policies (identified by a prefix e.g. CBX) will only use the building and personal property (PP) list (List A). Other policy prefix types may require a different list of key words (List B).

"Building & PP" keywords are List A. "Damages Include PP" is List B.

For List A (bldg & PP) if a key word for the list matches any word in the Description of Loss (item 37), then the claim is immediately assigned to an adjuster. For List B (includes PP) if a key word is not present in the Description of Loss (item 37) the loss is assigned out to an adjuster.

It has been recognized that the system may get a claim with a policy prefix that is identified as not being applicable to List A, but only have building damages. In this case, List A would be used. If personal property damage were added to the claim, List B would then have to apply.

For example a claim may be submitted with a policy prefix that is not specifically associated with List A. However, only building damages (Bldg.) are claimed (no personal property). In this case, only List A would be used.

In another example, a claim has both building and personal property damages, the policy prefix that is not specifically directed to List A and therefore List B will apply. List B requires one of the keywords in List B to be in the description of loss (item 37). If not, there is no match and the loss is assigned to an adjuster after recording the information on the claim. If a word in the description of loss (item 37) matches the List B keyword the claim continues to be adjusted electronically.

In another example, the policy prefix is identified from a list of certain prefixes to use List A. If a keyword in the Description of Loss (item 37) matches a word from the List A the loss is assigned out to an adjuster.

Each phrase in the key words must match exactly. For example, if the key word is "power surge", the word "power" itself will not be sufficient to cause an adjuster to be assigned. The key words that may be used in "List A" for Personal Lines is as follows: surge, electrical surge, power surge, power failure, utility interruption, ordinance, law, earthquake, quake, flood, surface water, waves, pump, sump pump, property in transit, shipment, missing property, lost property, lost, missing, neglect, intentional, defective, maintenance, credit card, fraud, checks, money order, war, terrorism, municipality, code, penalty, insect, cracking, settling, cracking, bulging, expansion, shrinkage, wear, tear, wear and tear, vacant, mechanical, mechanical breakdown, smog, animals, birds, under construction, rust, corrosion, deterioration, nuclear, atomic, invasion, governmental, pollutant, contaminant, shortage, mysterious, disappear, indirect, sewer backup, sewer, sewage, drain backup, backup of sewer, backup of drain, mold, fungus, wet rot, dry rot, rot, rotten and converted.

Key words that may be used for List B (words must match or claim is referred to an adjuster) may be as follows: fire, lightning, wind, windstorm, hail, storm, explosion, riot, civil, civil commotion, aircraft, plane, vehicle, car, smoke, vandalism, mischief, malicious mischief, theft, falling, weight of ice, weight of snow, water, freezing, volcano and volcanic.

The lists of damaged items (items 68–87) and description column (items 105–175) may be compared with a list of key word called "property not covered" as follows: animals, animal, birds, bird, fish, property of others, automobile, car, vehicle, motor vehicle, land, money, cash, checks, sentimental, sentimental value, leased property, lease, leased, crops, growing crops, property sold, property in transit, missing, credit, credit card, credit fraud, electronic funds, loss assessment, neighbor, cousin and parent.

If item 35 is checked yes or chosen in a drop down menu indicating a third party may be responsible the claim is automatically assigned to an adjuster once the client's customer completes the claim report.

If emergency services are required in any of items 39–43, then an adjuster is assigned to investigate immediately when the claim report is completed. This is client controlled to determine at what level the adjuster is involved.

The type of loss drop down (item 20) may include the following list of losses: fire, smoke, wind, hail, vandalism, theft, burglary, robbery and other.

Employee dishonesty is not applicable to a Personal Lines type claim.

The client's customer enters the deductible amount. On personal lines type policies this can be $100 to $5,000 and can vary incrementally. If a zero deductible is chosen, then the loss may be assigned to an adjuster. Each client will provide parameters for the deductible to be entered by their customer.

Once the claim report exceeds the threshold time allowed by the client, it is assigned out to an adjuster. For example, if the time to submit damages is 30 days and the claimant exceeds 30 days, an assignment of the claim is made to an adjuster.

Turning now to the page/item rules, page 1 (FIG. 2) may identify the personal lines carrier and the claim process. Page 2 (FIG. 3) may provide explanatory information as follows.

Personal Lines Insurance Company

Our customers, insureds and agents may now report a claim online to be immediately adjusted, paid and closed, if possible. Some claims may require additional information before they can be concluded. If you, you will be contacted by an adjuster. Please enter your policy number and name as it appears on your policy.

Page 3 (FIG. 4) may provide explanatory information as follows.

The icon from the fast track claim welcome screen takes you to the client's introduction page. It is proprietary to the client in style based upon that client's wants and needs for a Personal Lines insurance company. It may provide specific information to file the claim.

Personal Lines Insurance Company

Please report your claim by completing the online claim report questionnaire. Once completed a claim number will be assigned and provided to you to complete your claim. You have 30 days to gather information about your damages and complete the online claim.

For building damages you should estimate the cost to repair or replace the damaged property. You may know some of the material if you intend to do repairs yourself, allowing a reasonable charge for your own labor. If you need a contractor you may search on the list of approved contractors in your area, or obtain one of your own choosing. For the estimate you will need to provide the breakdown of costs online.

For personal property, also referred to as contents, you will need to list each item, its description; age by month and year, original cost and cost to replace today. To obtain replacement cost at this time or before replacing you must agree to comply with the policy conditions that require you to replace the property. As such, you must agree online that the property will be replaced.

If you have incurred additional living expense. This is expense to continue living when you are unable to live in your own home due to damage or destruction you must itemize the cost/expense you will incur. Hotel charges, additional rent, phone, and laundry. These expenses must be over and above your normal everyday charges. If you will require and extended time an indicate this so an adjuster may contact you as soon as possible.

Should you have questions please use the toll free number or contact us by email at homeowners.com. Once the claim report and damages are reported and acknowledged your claim may be adjusted and concluded online or an adjuster will be assigned. You will be notified immediate if an adjuster is assigned.

Page 3 (FIG. 4) requires the claimant (client's customer) who is signing-on to check a box (item 2) agreeing to the terms and conditions of the program. This will be required in addition to the name and relation to the named insured to continue.

Item 3 requires entry of the full name of the person entering the site. This will be included within the claim record as the person reporting the claim.

Item 4 requires entry of the relationship to the named insured. A drop down box may be provided that allows entry of the relationship (e.g., as the named insured, a resident relative (indicate which) or agent). This will also be included within the claim record.

Item 5 allows the claimant to enter a claim number. This is to signify a new claim or follow-up on an existing claim. If new, it takes the customer to the claim instruction page. This is retained in the claim record and on the log.

Item 6 allows the claimant to enter the date the loss is reported. This is retained in the claim record and within the log. Item 7 indicates activation of the NEXT icon which takes the claimant to Page 4.

Page 4 is used substantially the same as in the self-insured model. Page 5 is used somewhat differently.

For example, item 9 allows the claimant to enter a policy number. In this regard, most policy numbers have two parts, a prefix and a number. e.g. PRO 00223547. This is client specific and is used by the client to identify their insured.

Item 10 allows entry of the effective date of the policy. This date must be after the date of loss, item 18, or the claimant will be asked to confirm that the date is correct. If the claimant indicates that the entered date is correct and is before the policy date, then the loss will be assigned to an adjuster.

Items 11 and 12 allows entry of ownership information. Selection of boxes 11 or 12 on the claim report may activate a drop down menu to determine if the premises are owned, rented or leased.

Item 13 allows entry of an address. In this case, the street address of the premises insured. Items 14–19 are used in a manner similar to the self-insured claim.

Item 20 may be a drop down menu. The drop down menu may include a line for customer to choose various types of loss. This type of loss will go on the log. Loss types may include fire, lightning, burglary, theft, robbery, water, wind, flood, vehicle, vandalism, smoke, and other.

Item 21 may allow entry of a location of loss. It is compared with item numbers 13 and 14 earlier in the claim report and if the location of loss is different then the location described in 13 and 14, the claim would be declined and assigned to an adjuster for investigation.

Item 22 and 23 allow selection of whether the loss occurred on or off premises. Boxes 22 and 23 can be drop down menus. If an off premises loss if selected, the claim is declined and assigned out to an adjuster for investigation.

Items 24–29 are used somewhat differently. The text associated with item 25 may be changed to Personal Property. Items 24–29 allow the claimant to choose whether there is building damage, personal property, furniture, clothing, tools, money, securities, jewelry, additional living expense, or other damage. The claimant may chose more than one. Items 24–29 can be a drop down menus.

Item 30 is an interactive box that allows the claimant to enter a narrative of the types of property damages that are not already included in the boxes checked for personal property, jewelry, etc.

Item 31 allows the claimant to enter an estimate of the total dollar amount of all damages. Item 31 may also include a drop down menu that allows someone to choose a dollar range (e.g., 1 to 1000; 1001 to 2,500; 2501 to 3,500; 3,501 to 5,000; 5001 to 7,500; 7,501 to 10,000).

Items 32–34 are used in a manner that is substantially the same as the self-insured model. Items 35 and 36 allows the claimant to make a selection of whether a third party is legally responsible for damage. The entry can be a yes or no. Alternately, items 35 and 36 may be provided as a drop down menus of various third party options.

Item 37 is used in a manner substantially the same as in the self-insured model.

When Item 38 is activated, the claim is saved and assigned a claim number once this page is accurately completed. It takes the claimant to the next screen. If the Emergency Box was checked in the initial page from the claim instructions, then the claimant it taken to page 6, which is the emergency research page. Otherwise activation of the NEXT softkey 38 takes the claimant to page 7 if building damages were indicated, otherwise page 8 if personal property was indicated or page 9 if additional living expense were claimed. If more than one category was entered on items 24 thru 29, then the system 10 takes the claimant thru these damage screens sequentially.

Once the claim report is complete and emergency contact are requested, some claims are declined for online adjusting and must be handled by an adjuster. The client may request all claims be completed online as opposed to just those being adjusted electronically. For personal lines this will require a substantial database. Once the claim is assigned to an adjuster the data and future claim information goes with the client and the claim on the system 10 is closed and marked assigned to adjuster.

Those claims assigned to the adjuster and retained on the system 10 will require an adjuster authorization/approval once the client's customer submits the online information for damages. All claims reported may end in a pending or open status for a specified time, 30, 60, and 90 days, or maybe longer. A claim number is assigned at this point and can be referred to later by the claimant to come back online and complete various damage screens to conclude and submit the claim online for settlement.

Page 6 (FIGS. 8–9) are used somewhat differently. For example, item 39 allows the claimant to select the Adjuster Box 39 for serious and large loss. When the Adjuster Box is checked, the claim is reported by email or pager on a priority basis to the insurance company for an adjuster to be assigned and to make the phone call to the emergency cell phone number of the claimant. The client will determine how these are to be reported Item 40 allows the claimant to indicate that they need emergency services for water, fire or smoke restoration. In this case, the claimant checks box number 40 and the adjuster (or vendor) is sent the emergency cell phone number by pager. The client will determine which vendor, if any, will be assigned to receive emergency notification.

Activation of item 41 allows a claimant to request salvage teams to remove damaged merchandise. The cell phone number of the claimant is sent by pager to a vendor. Again, the client will determine which salvage vendor is on the program.

Activation of item 42 allows the claimant to request an investigation and expert (especially if others may be legally responsible for property damage). Again, the cell phone number of the claimant is sent by pager to the investigator. This may first go to an adjuster and the adjuster will determine what type of expert and who needs to be assigned, if any.

Activation of item 43 allows the claimant to request a building contractor or construction team. The contractor is notified by pager. The insurance company will determine if their contract repair vendor list can be utilized and how.

Activation of the SUBMIT item 44 causes the target of all the boxes, 39–43, which were checked to receive a priority e-mail or page advising them of the emergency number that was collected from the claim report Item 32. The system 10 would send an e-mail to the claimant at the email address that they provided in the claim report advising them that the emergency claim report of damage was received and they will be contacted shortly. If they do not hear from somebody shortly, then the system 10 will provide an alternative phone number the claimant can call in an emergency.

If from the claim report (FIGS. 6–7), the claimant clicks NEXT 38 and in the claim instruction page (FIG. 5), they did not identify this as an emergency, then the system 10 would take the claimant to the damage pages. The damage pages depend upon what was identified as being damaged in the claim report, items 24 thru 30. For example if the building (item 24) was damaged it would start with page 7.

If Personal Property (item 25, 26, 27, 29 and 30) were checked on the claim report, the claimant would get the personal property/contents damage screen, which is page 8. If additional living expense is indicated by checking Box 28, then page 9 (FIGS. 13–14) would need to be completed. This follows for each class of damage with a specific page.

Page 7 (FIGS. 9–10) may also be used somewhat differently. Items 46–53 are directed to damage to the building. The legent of item 49 is changed to Garage. Item 54 is the claim number and may start with numbers specific to the client.

Item 55 allows entry by the claimant of a job number assigned for building repairs by the preferred contractor, if any. If no preferred contractor is assigned this can be left blank. The claimant may need to indicate whether a preferred contractor was selected.

Item 56 is the total estimated building damages. This is not the amount claimed.

Item 57–59 can be a drop down menu that allows the claimant to enter whether or not he has an estimate. If yes, the claimant is prompted to enter the appropriate information in interactive boxes 60–66. If no, the customer receives information to contact a contractor. This may coincide with the use of item 55 to enter the contractor number and allows the system 10 to determine if it is a preferred contractor. Items 60–66 are contingent on the answer to item 57.

Item 67–88 are used similarly to the self-insurance model. Item 89, 91 & 92 requires the claimant to enter name, phone number and e-mail of the estimator for the contractor providing the estimate.

Item 90 requires the claimant to agree to direct damages. This is a required item that must be checked to continue.

Item 91 and 92 require the claimant to enter the office phone number and e-mail address of the estimator for the contractor, if any, who will do the work. If there is none, the system 10 provides a drop down menu to indicate there is no estimator.

Activation of the NEXT softkey 93 causes the system 10 to go to the Personal Property Damage (page 8), in the case where personal property/contents (personal property includes jewelry, money, tools, anything that is not real property or additional living expense) had been identified on the claim report (page 5, item 25). If not, the claimant is taken to Additional Living Expense (page 9), in the case where additional living expense is identified on page 5 item 28. Otherwise the system 10 proceeds to the Sworn Statement, page 10.

Page 8 (FIGS. 11–12) may also be used somewhat differently. For example, items 94–98 can be eliminated and do not apply to personal lines.

Item 97 lists the claim number. Each page will always have the claim number of the assigned claim. One claim number is provided for each occurrence/claim reported and one claim may include damages such as building, personal property and additional living expense.

Items 99–104 identifies salvage through a series of questions and rules. In personal lines, the system 10 asks if there is salvage, yes or no. If yes, a salver needs to be notified and the claim is assigned to an adjuster if the client doesn't wish to use salvers direct.

Items 105–175 are used by the customer to enter information about damaged personal property. The column for division, quantity, sell price can be eliminated. The claimant still needs an item number and description. Mark down is changed to Original Cost. Cost is changed to Replacement Cost. Amount Claimed is the same as Replacement Cost for each item and totals are taken to the bottom, item 175. If the client is paying replacement cost up front once the customer agrees to replace, item 176, then there are no further calculations.

Item 176 requires the client to agree the replace the property in accordance with the policy terms and conditions that require replacement in order to collect replacement cost coverage. Verification of replacement is difficult. Therefore the client's customer must agree by selecting item 176, replacement of property. The wording for the agreement is changed to reflect this condition.

Item 177 "NEXT" continues and goes to Additional Living Expense (page 9), if these types of damages are applicable to this claim. If not, it goes to the Sworn Statement in Proof of Loss (page 10).

Page 9 is used in a manner that is somewhat different than the use in the self-insured model. Item 178 is the claim number, again this is on every page.

Items 179–229 is eliminated for personal lines. Items 230–255 is also eliminated for personal lines.

Items 256–281 provide information about Additional Living Expense. The Acct. No. can be changed to Incurred or Estimated and the claimant must choose one of the two categories. The client may require all claims with estimated additional living expense over a certain dollar parameter be reported to the company for an adjuster to be assigned. The system 10 allows up to $1,000 estimated or incurred additional living expense.

Total for Additional Living expense, Item 281, is carried to the Sworn Statement In proof of Loss on page 10, Item 294. Items 281, 283 and 284 are eliminated for personal lines.

Item 286 requires that the claimant agree that all costs will be incurred. If it is not checked, then the claim can not continue with the NEXT icon 287.

The NEXT icon 227 takes the claimant to the final document for the claim, the sworn statement in proof of loss on page 10.

Page 10 (FIGS. 16–17) are also used somewhat differently. Item 288, the claim number carries over and is on every page. Item 289 is the same as item 20 from the claim report found on page 5. Item 290 is the same as item items 18 and 19 from the claim report found on page 5. It states the date and time of the loss. Item 291 is the same as item 37 on the claim report found on page 5. This provides a detailed description of the loss. The word "is" as the end of this item can be deleted. Item 292 is the same as total building damages found in item 88 on page 7. It carries forward.

Item 293 is the same as the total content damages item 175 found on page 8. It carries forward. Merchandise is changed to Personal Property.

Item 294 is the same as total additional living expense item 281 found on page 9. It carries forward.

Item 295 adds and totals here items 292, 293 and 294. Item 296 is taken from General Rule 16 for deductibles. The claimant must enter the amount of their deductible to continue. The system 10 may use a $500 deductible.

Item 297 is the net claim and is determined by subtracting the deductible, item 296 from the total damages, item 295. The result is entered in item 297.

Item 298 requires the claimant to agree to a statement verifying the validity of the claim. The check mark has the same force and effect as a signature. A space may also be provided where the person is required to type in their name and e-mail address.

The final icon 299 is SUBMIT. The claim report with the damage pages and proof of loss are emailed to the client's accounting department and others as identified on the distribution list. Additionally, the person that agreed to the terms, item 298, and entered their name and email address is on the distribution.

A specific embodiment of method and apparatus for processing insurance claims has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of processing an insurance claim related to property damage on a property and casualty insurance policy, except personal automobile and commercial automobile, as defined by the NAIC Uniform Property and Casualty Product Coding Matrix, such method comprising the steps of:

storing in memory plural sets of keywords, wherein each set of keywords is associated with at least one policy type and wherein the keywords in said plural sets of keywords are descriptive of property and causes of property damage;

receiving a claim from an insured for a loss to property, but not automobile property, and not a health care claim through an Internet connection, wherein the received claim contains a description of loss for determining a who, what, and why about how the loss occurred;

determining a policy type from said received claim;

identifying an insurance criteria based on said determined policy type, for evaluating the loss, wherein said insurance criteria is based upon insuring agreements, exclusions, coverage limits and terms and conditions selected from the group consisting of all risk of loss, named perils, accident to object, supplemental coverage, consequential loss, coverage extensions, exclusions, limitations and property not covered or limited;

retrieving from said memory a predetermined set of keywords that are associated with said determined policy type and with said identified insurance criteria;

matching said retrieved set of keywords with words contained within the description of loss of said received claim;

assigning the claim to an adjuster when any matched words of said matching step meets a predetermined criteria; and paying the claim without assigning the claim to an adjuster when said matching step does not meet the predetermined criteria.

* * * * *